(12) United States Patent
Hoarty

(10) Patent No.: US 11,863,804 B2
(45) Date of Patent: *Jan. 2, 2024

(54) SYSTEM AND METHOD FOR CONTINUOUS MEDIA SEGMENT IDENTIFICATION

(71) Applicant: INSCAPE DATA, INC., Irvine, CA (US)

(72) Inventor: W. Leo Hoarty, Morgan Hill, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,950

(22) Filed: Jan. 27, 2022

(65) Prior Publication Data

US 2022/0224952 A1  Jul. 14, 2022

Related U.S. Application Data

(63) Continuation of application No. 16/740,701, filed on Jan. 13, 2020, now Pat. No. 11,272,226, which is a
(Continued)

(51) Int. Cl.
*H04N 21/233* (2011.01)
*G06F 16/70* (2019.01)
(Continued)

(52) U.S. Cl.
CPC ......... *H04N 21/233* (2013.01); *G06F 16/683* (2019.01); *G06F 16/70* (2019.01);
(Continued)

(58) Field of Classification Search
None
See application file for complete search history.

(56) References Cited

U.S. PATENT DOCUMENTS

| 5,918,223 A | 6/1999 | Blum et al. |
| 6,990,453 B2 | 1/2006 | Wang et al. |

(Continued)

FOREIGN PATENT DOCUMENTS

| CA | 2563370 | 11/2005 |
| EP | 0 248 533 | 8/1994 |

(Continued)

OTHER PUBLICATIONS

International Search Report and Written Opinion dated Mar. 8, 2016 for PCT Application No. PCT/US2015062945, 9 pages.

(Continued)

*Primary Examiner* — Augustine K. Obisesan
(74) *Attorney, Agent, or Firm* — POLSINELLI LLP

(57) ABSTRACT

This invention provides a means to identify unknown media programming using the audio component of said programming. The invention extracts audio information from the media received by consumer electronic devices such as smart TVs and TV set-top boxes then conveys said information to a remote server means which will in turn identify said audio information of unknown identity by way of testing against a database of known audio segment information. The system identifies unknown media programming in real-time such that time-sensitive services may be offered such as interactive television applications providing contextually related information or television advertisement substitution. Other uses include tracking media consumption among many other services.

20 Claims, 18 Drawing Sheets

Related U.S. Application Data continuation of application No. 15/290,848, filed on Oct. 11, 2016, now Pat. No. 10,575,032, which is a continuation of application No. 14/953,994, filed on Nov. 30, 2015, now Pat. No. 9,465,867.

(60) Provisional application No. 62/086,113, filed on Dec. 1, 2014.

(51) Int. Cl.

| | | |
|---|---|---|
| *G06F 16/683* | (2019.01) | |
| *G06F 16/951* | (2019.01) | |
| *G06F 16/732* | (2019.01) | |
| *G06F 16/783* | (2019.01) | |
| *G10L 25/54* | (2013.01) | |
| *H04N 21/235* | (2011.01) | |
| *H04N 21/236* | (2011.01) | |
| *H04N 21/278* | (2011.01) | |
| *H04N 21/8352* | (2011.01) | |
| *G10L 25/12* | (2013.01) | |
| *G10L 25/06* | (2013.01) | |

(52) U.S. Cl.
CPC ........ *G06F 16/7328* (2019.01); *G06F 16/783* (2019.01); *G06F 16/7834* (2019.01); *G06F 16/951* (2019.01); *G10L 25/54* (2013.01); *H04N 21/235* (2013.01); *H04N 21/236* (2013.01); *H04N 21/278* (2013.01); *H04N 21/8352* (2013.01); *G10L 25/06* (2013.01); *G10L 25/12* (2013.01)

(56) References Cited

U.S. PATENT DOCUMENTS

| | | | |
|---|---|---|---|
| 7,043,473 B1 | 5/2006 | Rassool | |
| 8,595,781 B2 | 11/2013 | Neumeier et al. | |
| 8,769,584 B2 | 7/2014 | Neumeier et al. | |
| 8,959,202 B2 | 2/2015 | Haitsma et al. | |
| 9,055,335 B2 | 6/2015 | Neumeier et al. | |
| 9,465,867 B2 | 10/2016 | Hoarty | |
| 10,575,032 B2 | 2/2020 | Hoarty | |
| 11,272,226 B2 | 3/2022 | Hoarty | |
| 2002/0083060 A1 | 6/2002 | Wang et al. | |
| 2003/0018709 A1 | 1/2003 | Schrempp | |
| 2003/0033321 A1* | 2/2003 | Schrempp ............... G10L 15/26 | 348/E7.054 |
| 2003/0086341 A1 | 5/2003 | Wells | |
| 2004/0170392 A1* | 9/2004 | Lu ............................ H04H 60/59 | 348/E5.123 |
| 2005/0027766 A1 | 2/2005 | Ben | |
| 2005/0197724 A1* | 9/2005 | Neogi ..................... G10L 25/48 | 381/56 |
| 2005/0207416 A1 | 9/2005 | Rajkotia | |
| 2006/0277047 A1 | 12/2006 | DeBusk | |
| 2007/0168409 A1 | 7/2007 | Cheung | |
| 2007/0274537 A1 | 11/2007 | Srinivasan | |
| 2010/0083299 A1 | 4/2010 | Nelson | |
| 2010/0306805 A1 | 12/2010 | Neumeier | |
| 2011/0041154 A1 | 2/2011 | Olson | |
| 2011/0247042 A1 | 10/2011 | Mallinson | |
| 2011/0289099 A1 | 11/2011 | Quan | |
| 2012/0185566 A1 | 7/2012 | Nagasaka | |
| 2012/0272259 A1 | 10/2012 | Cortes | |
| 2012/0315014 A1 | 12/2012 | Shuster | |
| 2012/0317240 A1 | 12/2012 | Wang | |
| 2013/0209065 A1 | 8/2013 | Yeung | |
| 2013/0290502 A1 | 10/2013 | Bilobrov | |
| 2013/0318096 A1 | 11/2013 | Cheung | |
| 2014/0016696 A1 | 1/2014 | Nelson | |
| 2014/0088742 A1 | 3/2014 | Srinivasan | |
| 2014/0188487 A1 | 7/2014 | Perez Gonzalez | |
| 2014/0193027 A1 | 7/2014 | Scherf | |
| 2014/0195548 A1 | 7/2014 | Harron | |
| 2014/0201772 A1 | 7/2014 | Neumeier | |
| 2014/0237576 A1 | 8/2014 | Zhang | |
| 2014/0282671 A1 | 9/2014 | McMillan | |
| 2014/0287247 A1* | 9/2014 | Dowland ................. C08J 3/203 | 428/447 |
| 2014/0330413 A1* | 11/2014 | Anniballi .............. G06F 16/638 | 700/94 |
| 2015/0112988 A1 | 4/2015 | Pereira et al. | |
| 2016/0154880 A1 | 6/2016 | Hoarty | |
| 2017/0048559 A1 | 2/2017 | Hoarty | |

FOREIGN PATENT DOCUMENTS

| | | |
|---|---|---|
| EP | 1 760 693 A1 | 3/2007 |
| EP | 1 504 445 B1 | 8/2008 |
| EP | 2 685 450 A1 | 1/2014 |
| WO | WO 2012057724 | 5/2012 |
| WO | WO 2012108975 | 11/2012 |
| WO | WO 2012170451 | 12/2012 |
| WO | WO 2016089749 | 6/2016 |

OTHER PUBLICATIONS

Kabal (P.), Ramachandran (R.P): The computation of line spectral frequencies using Chebyshev polynomials, IEEE Trans. on ASSP, vol. 34, No. 6, pp. 1419-1426, 1986.

Itakura (F.): Line spectral representation of linear predictive coefficients of speech signals, J. Acoust. Soc. Amer., vol. 57, Supplement No. 1, S35,1975.

Bistritz (Y.), Pellerm (S.): Immittance Spectral Pairs (ISP) for speech encoding, Proc. ICASSP'93, pp. II-9 to II-12.

Extended European Search Report dated Mar. 22, 2018 for European Patent Application No. 15865033.3, 11 pages.

U.S. Appl. No. 15/290,848, "Non-Final Office Action", dated Mar. 5, 2019, 5 pages.

U.S. Appl. No. 15/290,848, "Notice of Allowance", dated Oct. 15, 2019, 10 pages.

U.S. Appl. No. 14/953,994, "Non-Final Office Action", dated Mar. 3, 2016, 33 pages.

U.S. Appl. No. 14/953,994, "Final Office Action", dated Jun. 1, 2016, 35 pages.

U.S. Appl. No. 14/953,994, "Notice of Allowance", dated Aug. 31, 2016, 15 pages.

U.S. Appl. No. 16/740,701, "Notice of Allowance", dated Oct. 29, 2021, 10 pages.

\* cited by examiner

SYSTEM AND METHOD FOR CONTINUOUS MEDIA SEGMENT IDENTIFICATION

CROSS-REFERENCE TO RELATED APPLICATIONS

This application is a continuation of U.S. patent application Ser. No. 16/740,701, filed Jan. 13, 2020, which is a continuation of U.S. patent application Ser. No. 15/290,848, filed Oct. 11, 2016, which is a continuation of U.S. patent application Ser. No. 14/953,994, filed Nov. 30, 2015, which claims the benefit of U.S. Provisional Application No. 62/086,113, filed Dec. 1, 2014. Each of these applications is hereby incorporated by reference in their entirety for all purposes.

FIELD OF THE INVENTION

The present invention relates generally to a media identification client server system with significant improvements in efficiently representing and identifying multimedia information. More particularly, the present invention addresses a computationally efficient and accurate media identification system requiring only minimal processing of media at the client device process prior to communicating to server means for continuous identification.

BACKGROUND OF THE INVENTION

Applications for automated content recognition are experiencing considerable growth and are expected to continue to grow fueled by demand from many new commercial opportunities including: interactive television applications providing contextually related content; target advertising; and, tracking media consumption. To address this growth, there is a need for a comprehensive solution related to the problem of creating a media database and identifying, within said database, a particular media segment that is tolerant of media content alterations such as locally-generated graphics within the client device altering the originally transmitted picture or a user watching a standard definition broadcast while using the zoom or stretch mode of their HDTV. These alterations can occur due to user actions such as engaging an electronic program guide (EPG, requesting additional program information that then appears in a set-top-generated pop-up window or selecting a non-standard video mode on a remote.

Automated content recognition systems typically ingest considerable quantities of data and often operate on continuous round-the-clock schedules. The amount of data consumed and managed by said systems qualifies them to be classified by the currently popular idiom of big-data systems. It is therefore imperative that said systems operate as efficiently as possible in regards to both data processing and storage resources as well as with data communications requirements. A fundamental means to increase operational efficiency while still achieving requisite accuracy is to utilize a method of generating a compressed representation of the data to be identified. Said compressed representations are often called fingerprints which are generally associated with identifying data from the audio or video content. Although a diverse range of algorithms of varying complexity are used, most rely on a common set basic principles which have several important properties such as: the fingerprint should be much smaller than the original data; a group of fingerprints representing a media sequence or media segment should be unique such that said group can be identified in a large database of fingerprints; the original media content should not be able to be reconstructed even in a degraded form from a group of fingerprints; and, the system should be able to identify copies of original media even when said copies are diminished or distorted intentionally or by any means of copying or otherwise reproducing said media. Examples of common media distortions include: scaling or cropping image data such as changing from a high-definition video format to a standard definition format or vice-versa, re-encoding the image or audio data to a lower quality level or changing a frame rate of video. Other examples might include decoding digital media to an analog form then digitally re-encoding said media.

A useful example of a typical media fingerprint process can be illustrated by examining the popular mobile phone application (app) called 'Shazam.' The Shazam app and many similar apps are typically used to identify a song unknown to the user particularly when heard in a public place such as a bar or restaurant. These apps sample audio from the microphone of a mobile device such as a smartphone or tablet and then generate what is known as a 'fingerprint' of the unknown audio to be identified. Said 'fingerprint' is generally constructed by detecting frequency events such as the center frequency of a particular sound event above the average of surrounding sounds. This type of acoustic event is called a 'landmark' in the Shazam patent U.S. Pat. No. 6,990,453. The system then proceeds to analyze the audio for another such event. When found the first 'landmark' and the second 'landmark' along with the time interval separating them are sent as a data unit called a 'fingerprint' to a remote processing means to be accumulated with additional 'fingerprints' for a period of time, usually twenty to thirty seconds. The series of 'fingerprints' are then used to search a reference database of known musical works where said database was constructed by said fingerprinting means. The match result is then sent back to the mobile device and, when the match result is positive, identifies the unknown music playing at the location of the user.

Another service, called Viggle identifies TV audio by means of a software app downloaded to the user's mobile device which relays samples of audio from the user's listening location to a central server means for the purpose of identifying said audio by means of an audio matching system. is The service provides means for users of the service to accumulate loyalty points upon identification of TV programs while said users watch said programs. The service user can later redeem said loyalty points for merchandise or services similar to other consumer loyalty programs.

The identification of unknown television segments generally requires very different processes between the identification of video and the identification of audio. This is due to the fact that video is presented in discreet frames and audio is played as a continuous signal. However, in spite of differences in presentation format, said video systems compress video segments to representative fingerprints and then search a database of known video fingerprints in order to identify said unknown segment similar to the identification process of audio. Said video fingerprints can be generated by many means but generally the primary function of fingerprint generation requires the identification of various video attributes such as finding image boundaries such as light to dark edges in a video frame or other patterns in the video that can be isolated and tagged then grouped with similar events in adjacent video frames to form the video fingerprint.

In principle, systems that identify video segments should be built using the same processes to enroll known video segments into a reference database as used to process unknown video from a client means of a media matching service. However, using the example of a smart TV as said client means, several problems arise with sampling the video arriving at the television using the processing means of the smart TV. One such problem arises from the fact that the majority of television devices are connected to some form of set-top device. In the United States, 62% of households subscribe to cable television service, 27% subscribe to satellite TV and a growing number of TV are fed from Internet connected set-tops. Less than 10% of television receivers in the U.S. receive television signal from off-air sources. In the case of set-tops providing television signals to the television set, as opposed to viewing television from off-air transmissions via an antenna, the set-top will often overlay the received video picture with a locally generated graphic display such as program information when a user presses an 'Info' button on the remote control. Similarly, when the user requests a program guide, the TV picture will be typically shrunk to a quarter-size or less and positioned in a corner of the display surrounded by the program guide grid. Likewise, alerts and other messages generated by a set-top can appear in windows overlaying the video program. Other forms of disruptive video distortion can occur when the user chooses a video zoom mode which magnifies the picture or a stretch mode when the user is viewing a standard definition broadcast but wishes the 4:3 aspect ratio picture to fill a high-definition television 16:9 screen. In each of these cases, the video identification process will fail in matching the unknown video sampled from said set-top configurations.

Hence, existing automated content recognition systems that rely on only video identification will be interrupted when a number of common scenarios arise, as outlined above, that alter the video program information by an attached set-top device. Yet further problems arise with identifying video even when video is not altered by a set-top device. For example, when a video picture fades to black or even when the video image is portraying a very dark scene, the prior art of video identification systems can lose the ability to identify the unknown video segment.

Interestingly, the audio signal of a television program is almost never altered but conveyed to the television system as received by a set-top device attached to said TV. In all of the above examples of graphics overlays, of fades to black or dark video scenes, the program audio will continue to play usually unaltered and hence be available for reliable program segment identification by means of a suitable automated content recognition system for audio signals. Hence, there is a clear need for an automated content recognition system that utilizes audio identification either alone or in addition to identifying video for the purposes of identifying unknown television program segments. However, the technology employed by the above mentioned music identification systems, such as Shazam, are not generally suited for identification of continuous content such as a television program. These mobile phone music identification apps are typically designed to process audio from a microphone exposed to open air which also imports significant room noise interference such as found in a noisy restaurant or bar. Also, the mode of operation of these above-mentioned audio identification applications is typically based on presumptive ad hoc usage and not designed for continuous automated content recognition. Hence, because of the many technical challenges of identifying audio from high interference sources, the technical architecture of ad hoc music ID programs is not suitable for continuous identification of audio. Said systems would suffer further from operating not only continuously but with very large numbers of simultaneous devices, such as a national or even regional population of television set-tops or smart TVs.

Many uses exist for identifying television programming as it is displayed on a television receiver. Examples include interactive television applications where a viewer is supplied supplemental information to the currently displaying TV program often in the form of a pop-up window on the same TV display from which media is identified or on a secondary display of a device such as a smartphone or tablet. Such contextually related information usually requires synchronization with the primary programming currently being viewed. Another application of detecting television programming is advertisement substitution also known as targeted advertising. Yet another use exists for media census such as audience measurement of one or more television programs. All of these uses and others not mentioned benefit from timely detection of unknown program segments. Hence, continuous audio identification alone or in concert with video identification can provide or enhance the reliability and consistency of an automated content recognition system.

BRIEF SUMMARY OF THE INVENTION

The invention is used to identify video and/or audio segments for the purposes of enabling interactive TV applications to provide various interactive television services in a client set-top box or smart TV. In addition, the invention provides a reliable means to identify program viewing statistics for audience measurement purposes.

The invention provides audio and video segment identification means where upon enrollment, as illustrated in FIG. 1, frames of video as well as seconds of audio are transformed into a common format of continuous coefficient streams 101 that can be tagged and stored in a reference database 102 for the purpose of providing candidate data for the identification of unknown audio or video segments when presented to the system of the invention from a client device enabled by the invention. The invention can operate in multiple modes such as with only video or with only audio or a combination of both video and audio and the system will provide accurate results within three to ten seconds. Audio and video segment information is prepared for the identification process in a manner 103 that is identical to the enrollment process 101 for the process of identification 104 of FIG. 1. The result of a successful match is either a unique identification code or the metadata of the audio/video segment 110.

In one embodiment of the invention, video segments may be utilized as the primary means of identifying unknown media segments. If a consumer device such as a set-top box displays locally generated graphics that overlay the primary video picture, video identification by the invention might be interrupted. If said interrupting occurs, the system of the invention can seamlessly switch to the audio segment information to continue identifying the unknown media content sent to the central matching server means from said consumer device.

The ability to dynamically switch between audio and video segment identification is further enhanced by an embodiment of the invention where audio segment information is transformed by a Linear Predictive Coding (LPC)

means of the invention from a stream of digital audio samples to a stream of coefficients or symbols with characteristics similar to the video segment transformation process. Said characteristics include a broad set of symbols, called coefficients, that exhibit wide variability without a direct correlation to frequency, unlike other time-to-frequency transforms such as the well-known and popular Fourier series. Furthermore, the said coefficients process will reliably repeat in values for the same or largely similar segments of audio, hence, exhibiting the very desirable characteristics of apparent high entropy while retaining repeatability. Another important feature of the LPC process of the invention is said coefficients values remain essentially stationary for time intervals of a minimum of 20 milliseconds (ms) to as much as 100 ms. Said stationary time frames allow the coefficients to be treated with processing means similar to the video pixel sampling process of Neumeier U.S. Pat. No. 8,595,781, incorporated herein in its entirety by reference, which provides the further advantage of allowing the use of continuous data matching schemes employing high-dimensional algebraic suspect selection in conjunction with time-discounted scoring means such as Path Pursuit as taught by Neumeier. This is in sharp contrast to prior art where feature vectors and other means are used to find landmarks and landmarks are combined to form fingerprints as exemplified by the popular Shazam music identification service and many other audio identification systems.

Audio data is considerably different from video data in most respects yet the audio signal is transformed by the invention into sets or frames of coefficients, also known to the art as 'cues', in such a way as to resemble sampled pixel values of video information. This aspect of data similarity between video and audio cues allows the advantageous central matching means of the invention to be used interchangeably for either matching unknown audio against reference audio or unknown video against reference video data or to process both simultaneously, if an application should require this.

The invention provides a means to continuously identify media information from a plurality of client devices such as smart TVs, cable or satellite set-top boxes or Internet media terminals. The invention provides a means for samples of media received by said devices to be transformed into continuous frames of compressed media information for identification by a central server means. Said central server means will identify unknown media segments within three to ten seconds and provide the identity of the previous unknown segment back to the respective client device that provided said segment for use in interactive television applications such as the display of contextually related content in overlay windows, for instance, or for the purposes of advertisement substitution. Additionally, the identification of media segments can be supplied to other processes of the server, or external systems via a network, for media census such as audience measurement applications.

The invention is based on the transforming of audio into time-frozen frames of coefficients in a continuous process that is similar to the continuous video frame processes of the prior art (Neumeier patent) and is accomplished by understanding that, in Neumeier, the video information is processed by finding average pixel values from a plurality of video frame locations within a video frame. Said video frame information is enrolled in the matching systems continuously, generally at a rate of at least multiple frames per second but not necessarily the full video frame rate of ordinary television signals. Likewise, the identification phase of the Neumeier patent allows said video frame information to be collected and transferred to the central matching means of the invention at video frame rates less than the full frame rate of the unknown video segment as long as the frame rate is not greater than the enrollment frame rate. The audio information is processed as overlapping frames of typically short duration audio segments of typically 20 to 100 milliseconds. It is known that certain audio channel characteristics such as the power spectral density of a signal is effectively stationary over short intervals of between 20 to 100 milliseconds and can be converted to coefficients that do not change appreciably within said frame time. Hence a means is available to transform continuous audio data into essentially time-frozen frames of coefficients that provide an efficient means to store known audio information in a database then later search by algorithmic means to identify an unknown audio segment.

In addition, it has been determined in the process of development of the invention that said coefficients have entropic characteristics similar to said video coefficients (cues) of patent U.S. Pat. No. 8,595,781 providing the ability to store said coefficients by means of a locality sensitive hash indexing means to form a searchable reference database. As with video, during the identification phase, the database can be searched by linear algebraic (matrix mathematical) means to find candidates in multidimensional space. Said candidates, also called suspects, can be represented by a token placed in a bin with characteristics resembling a leaky bucket providing an effective scoring means known in the art as time-discount binning to find a match result from the harvested suspects. Yet another effective means to score candidate matches is by means of correlation of said unknown cue to one or more candidate (known) cues. Said means of correlation, not to be confused with auto-correlation as used herein, is well known to the skilled person for finding the closest match of a reference data item to one data item of a set of test data items. Hence, said scoring means by the process of mathematical correlation produces a best match by the identification system in place of time discount binning.

It should be understood that the coefficient frame generation rate during the identification process can be less than the coefficient frame generation rate used during the enrollment process as still provide sufficient information for the matching system to accurately determine the identity of an unknown audio segment in a three to ten second time interval. For example, the invention allows the enrollment rate to operate at, say, 20 millisecond intervals (with 50% overlap, for example) equaling 100 frame times per second. A client device could transmit frames to the matching server means for identification at perhaps 50, 25 or 10 frames per second or any reasonable multiple of 100 in order for effective matching to occur by the identification mechanism of the invention.

Once audio is transformed from a time-based to a frequency-based representation, additional transformations may be applied in order to generate certain further refinements to coefficient frame (cue) sets. In this step, one finds a diversity of applicable algorithms. The objective is to reduce the data dimensionality and, at the same time, to increase the invariance to enrollment versus identification sample alignment. Hence, a multiplicity of coefficient generation capabilities exists where any one of said coefficients can be chosen for use in data enrollment and identification assuming only one specific choice is in applied at any given time for both enrollment and for identification.

This invention provides a means to identify audio or video information from any source of media such as cable, satellite or Internet delivered programming. Once identified, the invention can send a signal from the centralized identification means to a client application of the invention by means of a data network causing said application to display contextually targeted or other content on a television display associated with the client device providing the unknown media information. Likewise, said contextually coordinated content can be supplied by said identification means to a second screen device such as a smartphone or tablet. Similarly, upon identification of an unknown media segment, the invention can maintain a viewing census for audience measurement of specific television programming for use by third-parties such as television advertisement agencies or television networks.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

DETAILED DESCRIPTION OF THE INVENTION

Figure 2:
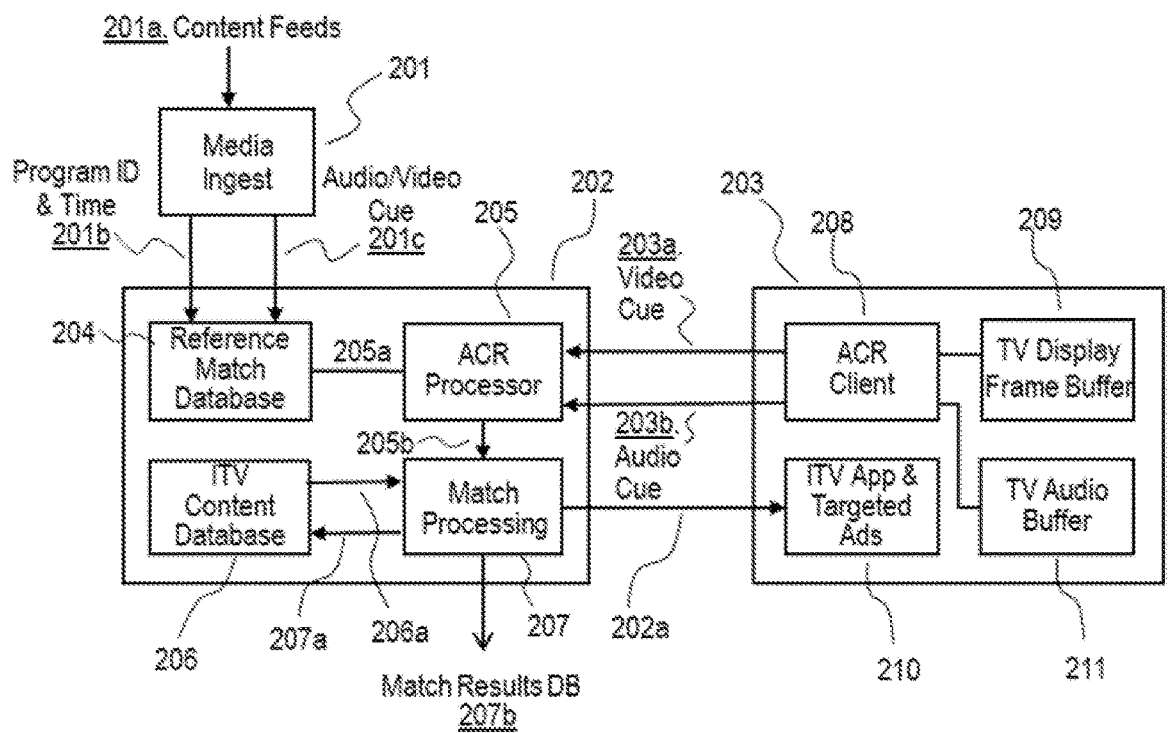
FIG. 2 is a block diagram of the server 202 and client 203 means of the invention. One or more content sources 201a are supplied to a Media Ingest means 201 which produces Audio and/or Video Cue data 201c as well as providing associated metadata in the form of Program Identification and Timecode 201b information for each of the media segments. Said media information is entered into a Reference Match Database 204 which is queried by Automated Content Recognition (ACR) Processor 205 to process and identify unknown audio 203b and/or video 203a segments as supplied by one or more client devices 203. Said client device consists of an ACR Client 208 which converts the contents of a television frame buffer 209 and/or television audio buffer 211 into respective cue sets which are sent to server 202. Upon successfully matching an audio or video segment, ACR Processor 205 sends a message to Match Processing means 207 which thereby examines an Interactive Television (ITV) Content Database for the presence of instructions and possibly data to be transmitted by network to client device applications 210 for local processing by client device 203. Said processing may include the display of supplemental information in a window on a television display with information associated with the program segment detected by the process of the invention. Additionally, Match Processing 207 may provide results to a measurement database such as an audience measurement system 207b.

In one embodiment, as illustrated in FIG. 2, the system identifies audio 203b and video 203a information from television programming by means of a client application 203 of the invention operating within the processor means of a cable TV, satellite or Internet-connected set-top box or within the processor means of a smart TV. In an example embodiment, said client application process typically operates on the audio 211 and/or video 209 information just prior to said information playing to the speakers and/or display of said television device. Said audio and/or video information is processed by the invention to produce a highly-compressed, continuous stream of frame representations of the respective audio and/or video signal by means of ACR Client 208. Said frame representations are transmitted 203*a* and/or 203*b* via a network, typically the Internet, to a server means 202 of the invention for identification. Said frame representations are of the form of select averaged pixel values for video frames and transformed power spectral coefficients for audio information.

Figure 1:
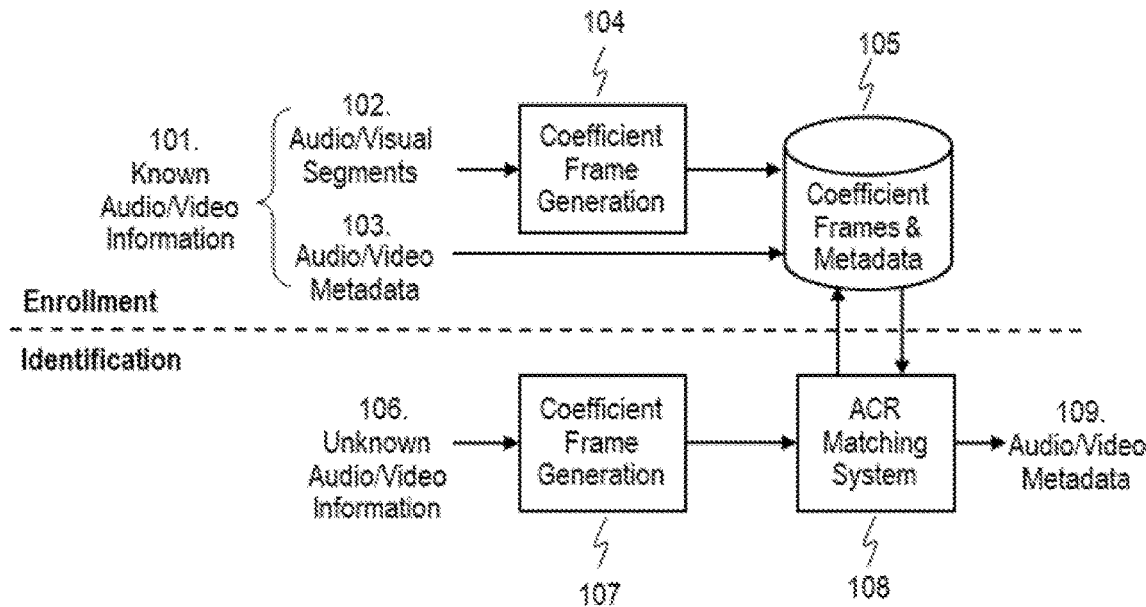
FIG. 1 is a top-level block diagram of the basic functions of an automated content recognition system. Known audio/video information 101 consisting of audio and/or video segments 102 and metadata (program information) 103 is processed and transformed into coefficient frames 104 which is stored in a reference database 105. Unknown audio and/or video information 106 is processed into coefficient frames 107 by means of a similar process as 104 and supplied to an Automated Content Recognition (ACR) system 108 which compares the data against said reference database 105. When said unknown audio/video segment is identified, audio and/or video metadata (program information or segment ID) is output 109.

In order to identify unknown media segments of audio and/or video information, said information must first be enrolled by the identification server means of the invention 104 and 105 of FIG. 1. Said enrollment process is typically the same or similar to the process rendered by a client device 107 to send said coefficient representation to said server 108. Said enrollment data is received by the server 102, processed and then stored by the server at 105 for later utilization by the identification process 108.

Referring again to FIG. 2, upon successfully identifying the unknown media segment at ACR Processor 205, the system of the invention can search a process of the server by means of Match Processing 207 to find a client service in ITV Content Database 206 that may be notified or triggered by the presence of the media segment. Said client event may include transmitting a trigger signal 202*a* to a client application 210 of the invention that displays contextually related information such as information about the program plot or an actor in the program or any of a variety of interactive television services available from the smart TV or set-top box. Likewise, said trigger could cause a currently displaying television advertisement to be substituted for a different advertisement that is more relevant to the viewer. Said ad substitution process is also known to the skilled person as targeted advertising. Yet another use of said trigger is to update a viewership database via 207*b* to maintain a viewing census for audience measurement purpose. Said census is typically less time sensitive that the other interactive TV uses described above.

Audio and video match data streams are created by separate and distinct processes however each process results in data structures of similar characteristics which may then be applied to separate databases yet serviced by equivalent server means of the invention for both enrollment of the data into a reference database as well as for use by the media matching means of the invention for identification of unknown media segments from client devices. Video and audio coefficients, though somewhat similar in characteristics of dimensionality and entropy, are maintained in separate databases and it should be obvious to the skilled person that audio data cannot be used to search a video database and vice versa. However, the processing means and database structures are similar and are largely the same for both types of media hence affording an advantageous economy of scale for systems employing both video and audio matching.

Video coefficients are generated from video information as taught by the invention of patent U.S. Pat. No. 8,595,781. The searchable audio representations of the invention must be formed from a very different type of media than video information. However, the end result of the process is a continuous stream of coefficients frames that have the similar characteristics to the video frame information as created by said referenced patent.

For the creation of searchable frames of audio coefficients from audio information, it is a fundamental aspect of the invention that the power spectral density of a typical audio signal such as television audio remains essentially stationary for a period of 20 to as much as 100 milliseconds (msec) which is in range of a single television frame of approximately 33 milliseconds for U.S.-based standards and 40 milliseconds for the non-U.S.-based television. Hence, an audio signal can be segmented into frames and then converted to a power spectral representation and stored in a searchable multi-dimensional reference database with a process similar to video frames, as taught by Neumeier, from which a subset of pixels is sampled and stored in a match database. One embodiment of this invention that provides the necessary audio data transformation employs the use of Linear Predictive Coding (LPC) as the primary step to convert an audio signal into said audio coefficient representations to then be transmitted to the server of the invention. The use of LPC or an equivalent transform allows for flexible and efficient transformation of the audio signal into a highly compressed form that can be further manipulated to enhance the search and selection efficiency of the overall system of automated content recognition.

In contrast, the prior art for audio matching may convert, for example, an audio signal from a time to frequency representation using, for example, a Modified Discreet Cosine Transform (MDCT), a Med Frequency Cepstral Coefficient (MFCC) process or a Discreet Fourier Transform, etc. Once the signal is converted, the prior art may find frequency events above a particular magnitude, sometimes called landmarks, and then measures the time interval between events or landmarks to form so called fingerprints for storing reference media segments. The same process is then used by a client device for producing fingerprints to be submitted to identify unknown media segments.

For the purposes of matching audio information, the invention does not use the fingerprint means of the prior art but rather creates continuous streams of coefficient from fixed frames of audio for building a reference database and then, for matching unknown media segments, a similar process is applied by a client device to an unknown audio segment and said coefficients are supplied to a matching server means utilizing said reference database. It should be understood that the coefficient process of the invention can be realized by a variety of different but related mathematical transforms as charted in FIG. 20 which are somewhat similar to those used by prior art. However, the many additional steps by the prior art in the formation of fingerprints constructed from identifying landmarks or other unique constructs is not in any way utilized by the invention. Hence, the invention is able to operate on continuous streams of media where the prior art cannot. Additionally, the invention is massively scalable to supporting millions of client devices with high accuracy and the further advantage of low processing overhead in the client device.

Returning to FIG. 2 of the invention showing the client to server basic functions and communications paths, a client device 203 contains a processor means capable of executing computer programs and client device provides access to said processor means to the video 209 and audio 211 buffers of said client. An ACR Client 208 application periodically samples data from said video and audio buffers and processes video 203*a* and audio 203*b* cues where a cue is composed of the elements of FIG. 17 1706. In this embodiment, the elements of a cue consist of 16 coefficients and time-code consisting of the local time (also known as wall time). Said cues are transmitted via a network to the server means of the invention 202. An automated content recognition (ACR) processor 205 receives said cues and performs a matching process where received cues are identified by means of searching reference media match database 204.

Figure 22:
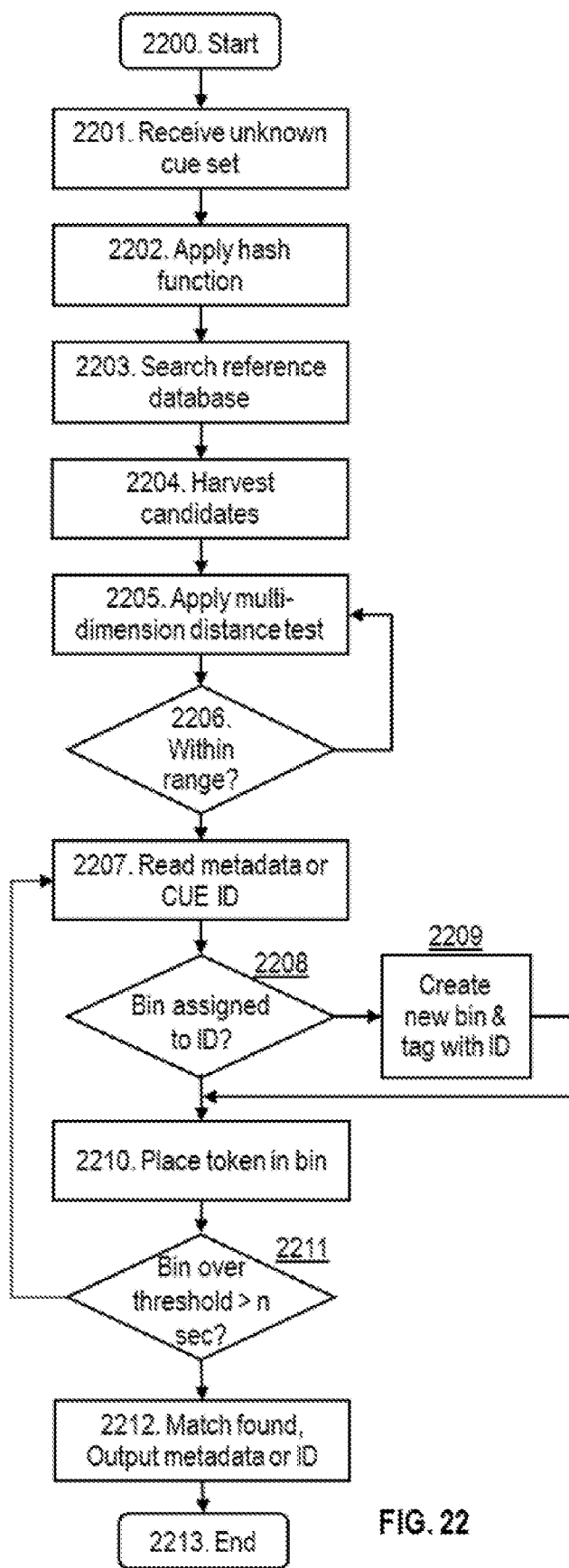
FIG. 22 This flow chart defines the steps of matching a series of coefficient frames representing an unknown audio segment. The candidate harvesting (determination) and the time-discount binning is the same as taught by Neumeier patent.
Figure 22A:
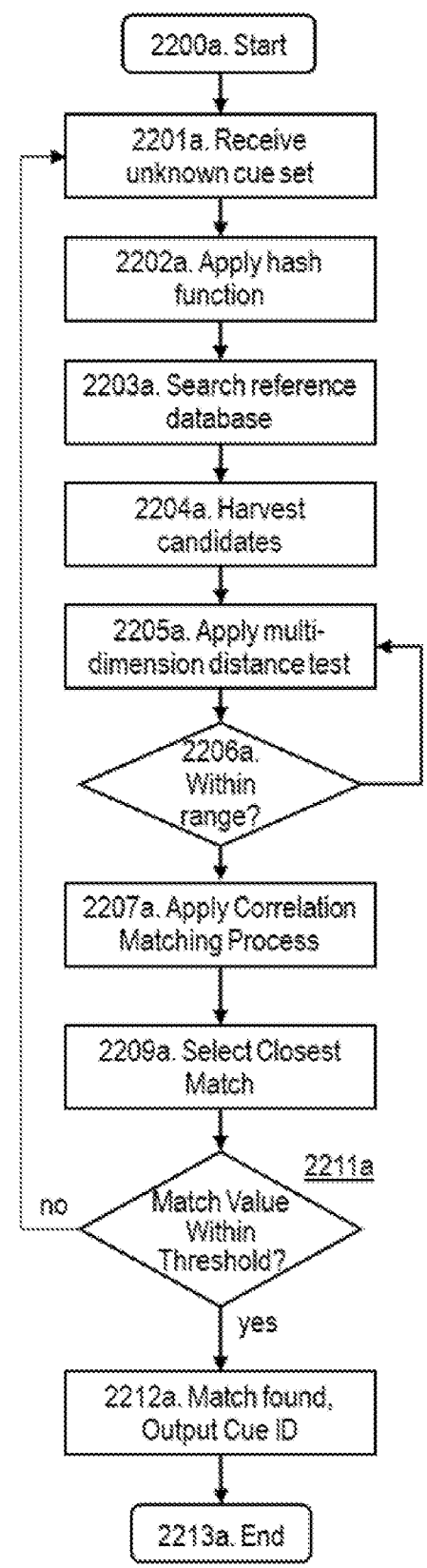
FIG. 22a This flow chart defines the steps of matching a series of coefficient frames representing an unknown audio segment. The candidate harvesting (determination) is supplied to a process of correlation of the unknown cue set to one or more suspect (candidate) cues. The closest match is further evaluated and if above a threshold is then output as the result.

Said processor 205 can provide useful match results by a variety of means, for example, by the use of Path Pursuit of Neumeier or by means of the correlation of an unknown cue set to a set of suspect cues. The correlation process is diagrammed in FIG. 22*a*. Positive identification from 205 is conveyed to a match processing means 207 which can execute a variety of functions such as providing contextually related content to the client device as taught by patent U.S. Pat. No. 8,769,584 B2 of Zeev Neumeier, incorporated herein in its entirety by reference. The matching processing 207 can also provide statistical information to match results service 207*b* for audience measurement purposes or other audience measurement services.

Figure 3:
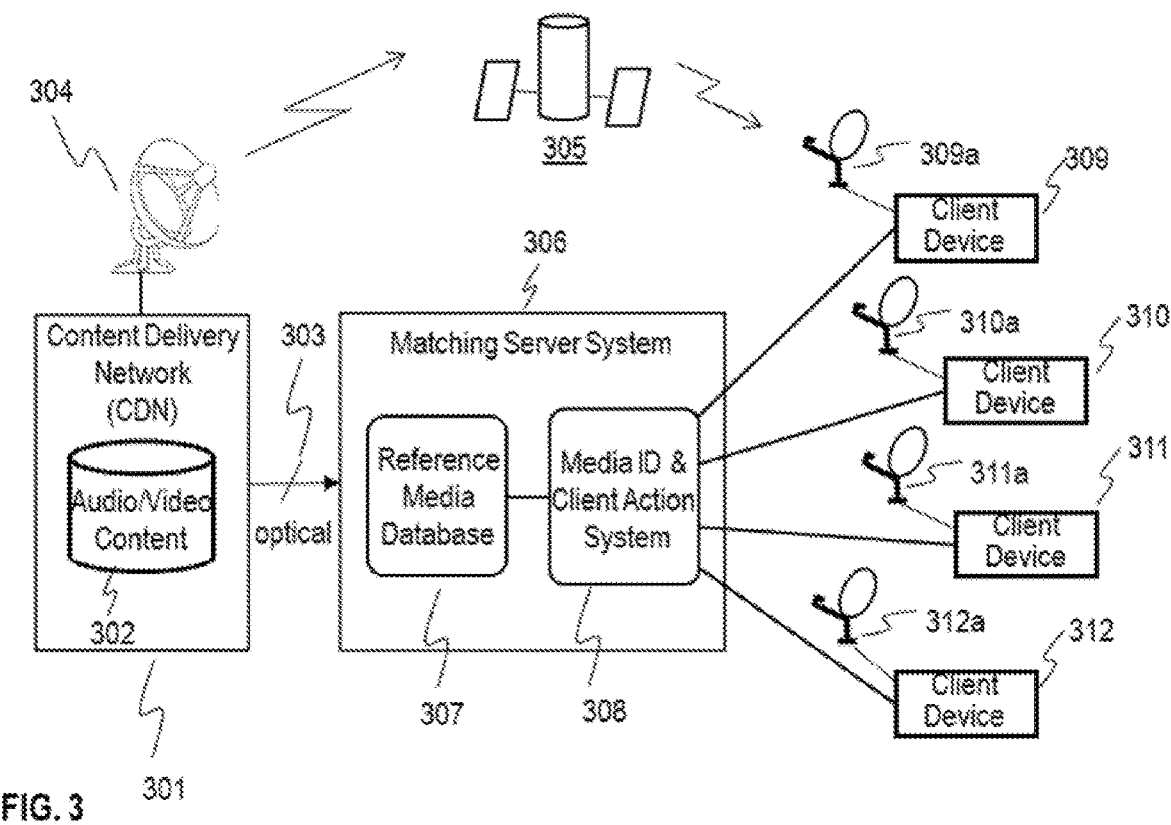
FIG. 3 is a block diagram of an advantageous system that illustrates a means for the invention to receive media information such as radio or television programming broadcast from a Content Delivery Network 302 via, for example, optical transmission means 303 such that the Matching Server System 306 will receive said programming in advance of the client devices, such as a smart TV, such that the content can be processed and stored in a Reference Media Database 307 with sufficient time such that the system is ready ahead of the arrival of unknown media from Client Devices 309 to 312. The network distribution of radio or television programming is often provided to service providers such as satellite and cable TV providers by means of fiber optic networks which typically exhibits network latencies of fractions of one second whereas the client devices may receive content via satellite or by said content passing through additional processing in the headend of a cable system such that a delay is incurred of about two to five seconds or possibly longer. This difference in distribution time between the backbone and the home delivery is sufficient to allow the server means of the invention to provide real-time processing of unknown audio or video segments as the known data from the same sources as received by said client devices will have already been processed and stored for use by said Matching Server means well in advance of any queries of its matching service. Hence, interactive TV services such as contextually-related information display or advertisement substitution can be carried out very near the start of the playout of the identified segment.

FIG. 3 shows how the invention has the ability to provide continuous identification of, for example, television programming. Many interactive television applications are made possible by a system that has timely knowledge of the current program displayed on a television receiver. Such applications include targeted advertising as well as contextually trigger information displays. Though not necessarily time sensitive, accurate audience measurement is also enabled by the system of the invention. FIG. 1 shows media information processed by the enrollment system in order to populate a reference database against which unknown media information is tested for identification. The obvious problem is how to get data, such as television programming, into a central database quickly enough that the same television programming entering the system from the client device can be matched without delay. The answer lies in the fact that the central enrollment system received media content from the television distribution backbone which arrives at the central means of the invention usually four to ten seconds ahead of the same programming arriving at the television receiver of the client device. Hence the system has sufficient time to process incoming reference media ahead of any queries requiring said data.

Figure 4:
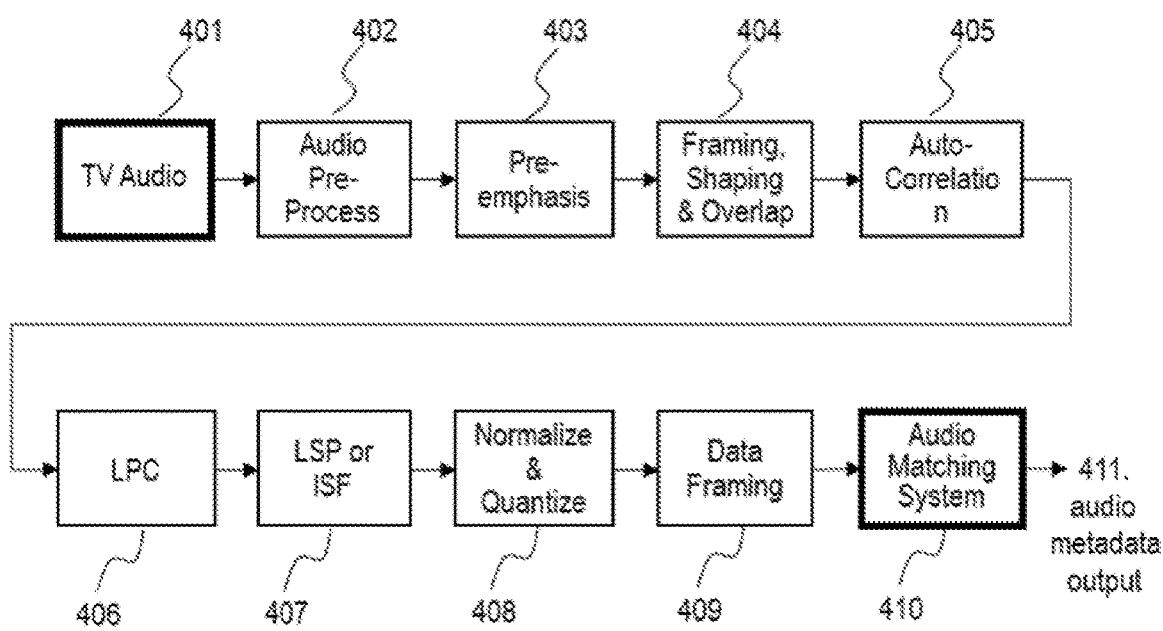
FIG. 4 is a flow diagram of the processing of raw audio input 401 from a receiver showing the steps of preprocessing 402; pre-emphasis (if applied) 403; framing, shaping & overlapping of audio segments 404; autocorrelation 405 to prepare the signal for the process of Linear Predictive Coding 406; then LPC coefficient transformation into either Line Spectral Pairs or Immittance Spectral Frequencies 407; then post-processing of coefficients by means of normalization & quantization 408; and formation of quantized coefficients into 'cues' sets 409 to be transmitted to an Audio Matching System 410 which provides Audio Metadata (Identification) 411 when an audio segment is successfully identified by said matching system.
Figure 6:
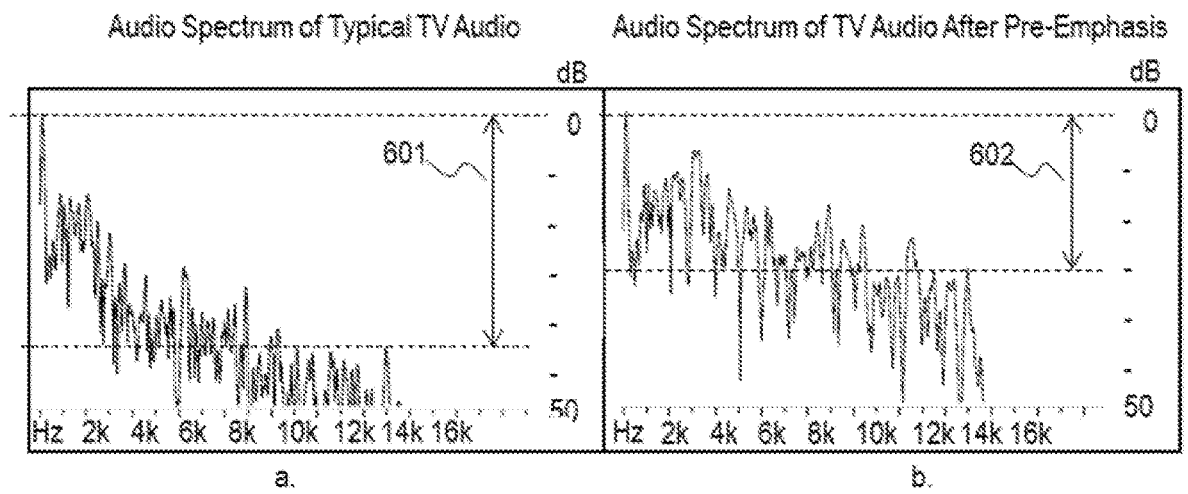
FIG. 6 is a plot (a) of typical television audio spectrum before the pre-emphasis filter of FIG. 5 is applied to said signal. A measurement of the difference in amplitude of the audio signal from low-frequency average peak (around 500 Hz) to high-frequency average-peak 601 shows a range of approximately 45 dB. Plot (b) shows the increased signal strength of high frequency audio components after plot (a) is processed through filter of FIG. 5 with the high-frequency information increased to a beneficially narrower range of 30 dB 602 between said frequencies.
Figure 7:
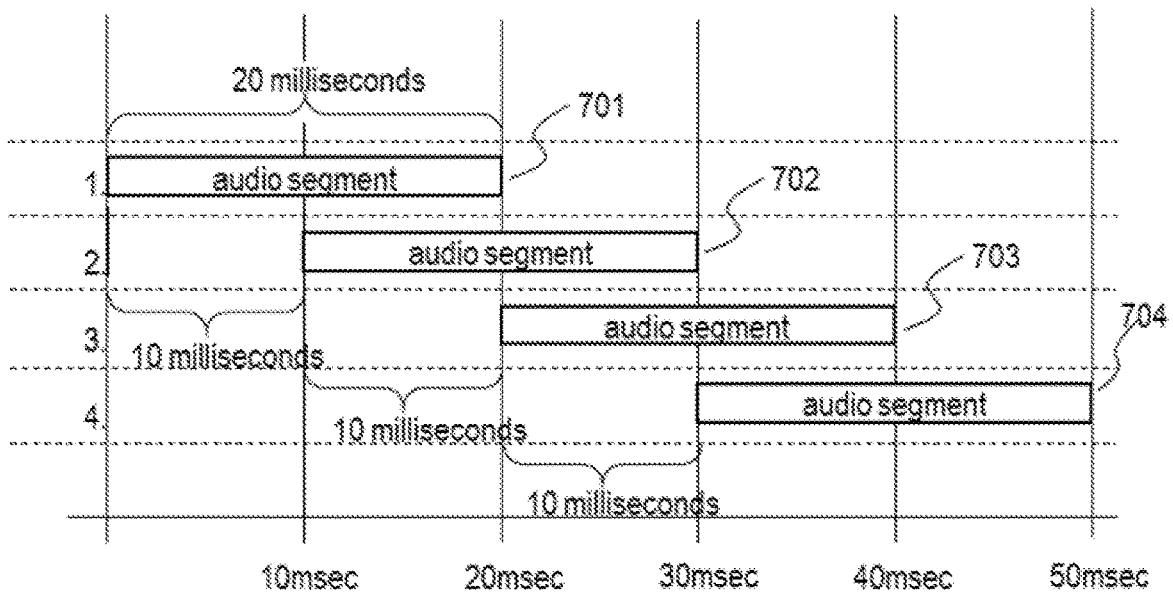
FIG. 7 illustrates an audio segment overlap 701 to 704 as employed by the invention. In one embodiment, the invention uses 20 millisecond audio segments with a 10 millisecond overlap. In certain embodiments, segment lengths can beneficially utilize segment lengths up to 100 milliseconds and overlaps can be beneficially realized from 10% to 90% of the segment length.
Figure 8:
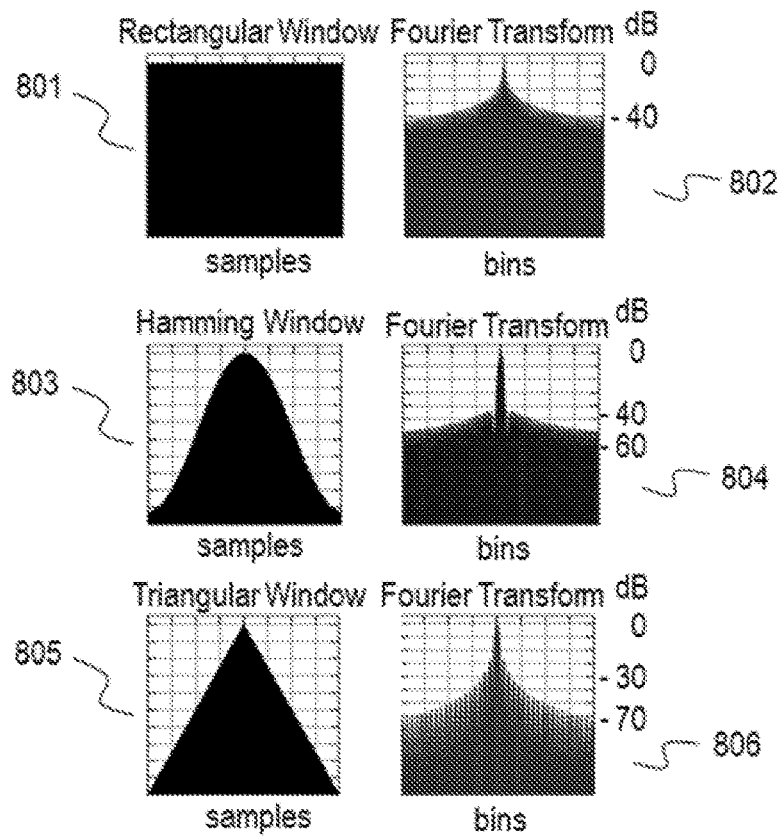
FIG. 8 is a plot of signal framing showing the spectral effects of various shaping functions as applied to an audio frame. The graph 801 shows a simple Rectangular Frame with an abrupt start and stop resulting in Fourier transform 802 showing significant sideband noise added to the signal of interest as a result of the sudden discontinuities. Plot 803 illustrates a Hamming Window widely used in voice communications systems. The resulting Fourier transform 804 shows an optimized signal with harmonic information suppressed by >50 dB. Plot 805 shows a relatively simple Triangular Window Function which has a Fourier plot 806 close in quality to the Hamming window plot 804 but requires far less computation to apply to the audio frame and, hence, is most advantageous for application with consumer electronics devices such as smart TVs or set-top boxes with limited computational means.
Figure 10:
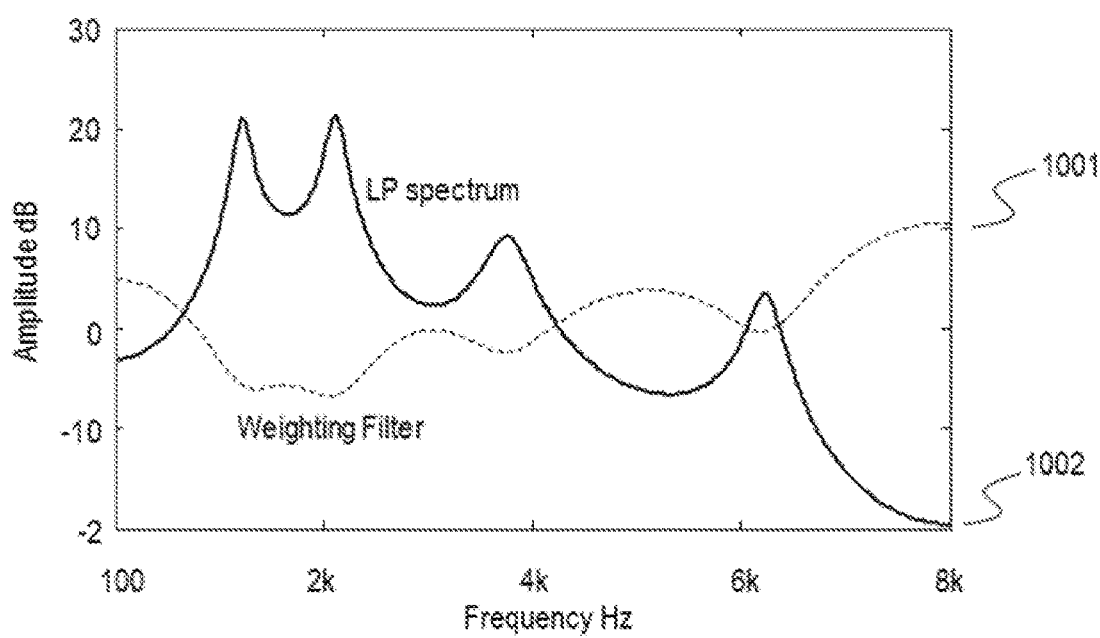
FIG. 10 is a plot of a Linear Predictive (LP) spectrum 1002 illustrated with a plot of a weighting filter 1001 appropriate to normalize the coefficients for optimal quantization.

In a preferred embodiment of the invention, FIG. 4 depicts the steps of converting a client television receiver audio 401 into data suitable for transmission to an audio matching system 410. The process of said transformation begins with the audio pre-processing function 402 where digital audio received from the audio buffer of a television receiving device is converted from stereo to monaural by means of summing said stereo information and may be further processed by a down-sampling step where, in one embodiment, said digital audio may be provided at a higher sample rate, for example 48 kHz but is to be processed by the invention at, for example, 16 kHz. Other preprocessing steps may include volume normalization and band filtering. Process 403 applies a process of pre-emphasis where the audio signal is passed through a high pass filter with the filter characteristics shown in FIG. 5. The raw audio FIG. 6*a* is portrayed in a representative spectral plot of a representative television audio segment and the post equalized audio is portrayed in FIG. 6*b* where the audio is enhanced per the filter parameters of FIG. 5. The pre-emphasis process of 403 enhances the dynamic range of certain coefficients and thus improves the quantization process 408 of the coefficients. Data is then divided into frames of 20 ms and overlapped with 50% of the previous frame as depicted in FIG. 7. The frame audio is then shaped with a triangular window function 805 as depicted in FIG. 8 with a resulting spectral distribution of 806. The next step in the process is autocorrelation of the framed audio 405 then the LPC process 406 is applied whose coefficients are further transformed by the ISF function of 407 which are then normalized by a weighting function similar to 1001 of FIG. 10 in step 408 which also includes the step of quantization. Data is then framed into cue sets 409 and sent to the audio matching system 410 for either enrollment of the reference audio information or for identification process of unknown media segments.

Figure 20:
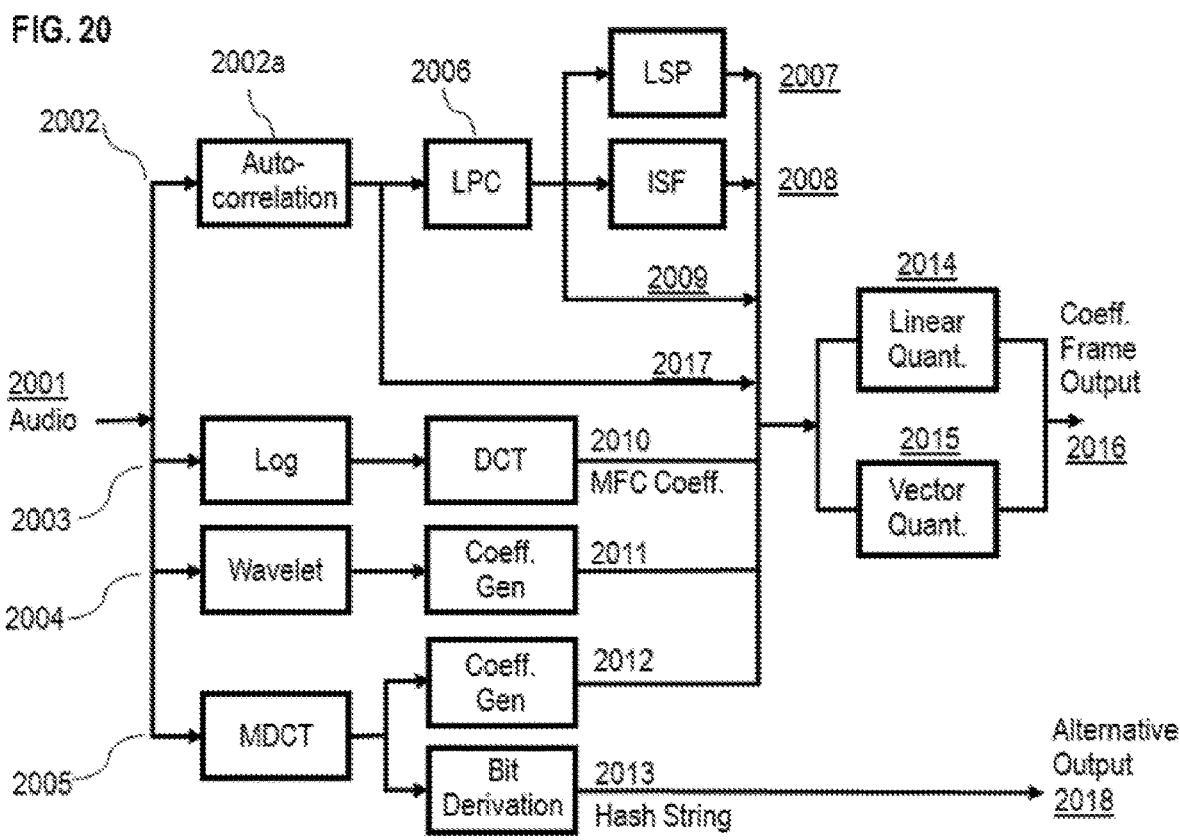
FIG. 20 is a matrix diagram of possible combinations of the transformation from audio input to coefficient or hash string output. In all paths through said matrix, with the exception of output 2013, the coefficients are quantized by either a linear process 2014 or by means of vector quantization 2015 then output from the system at 2016. In all of these processes, audio is transformed into high-entropy coefficient sets representing frames of audio with near stationary power spectrum for the duration of the audio frame hence generating coefficient that can be appropriately hash indexed and applied to a search and scoring means of Path Pursuit for the continuous identification of audio segments.
Figure 21:
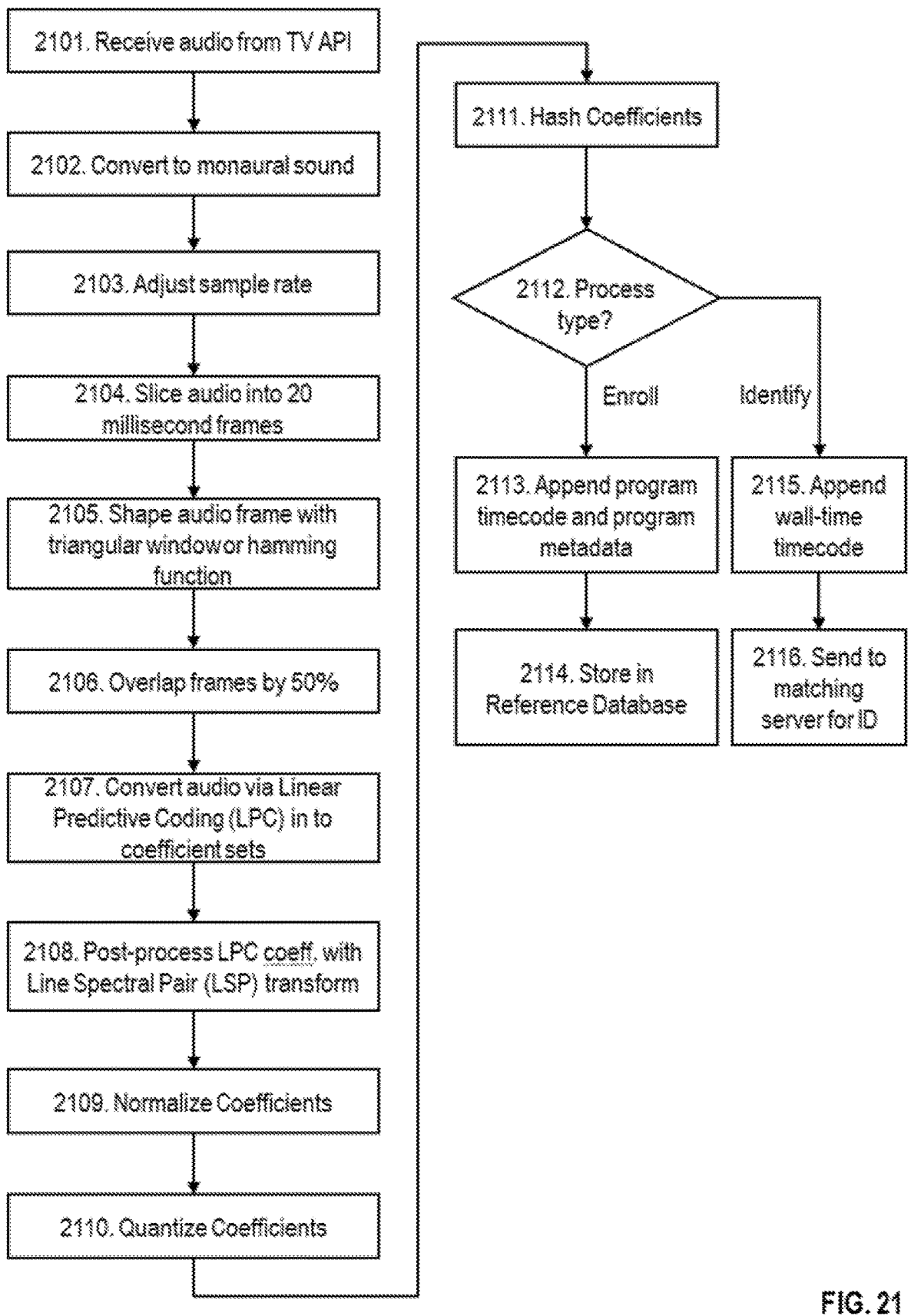
FIG. 21 This flow chart includes steps in which content audio matching may be performed.

In the preferred embodiment of the invention, Linear Predictive Coding (LPC) is utilized for the primary step of coefficient generation but alternate embodiments include: Mel-Frequency Cepstral Coefficients (MFCC), Modified Discreet Cosine Transforms (MDCT), and/or Wavelets among others. FIG. 20 represents a block diagram matrix of various alternatives available to the invention for transforming audio into coefficients usable by the invention. Said matrix maps four families 2002, 2003, 2004, 2005 of possible algorithm combinations suitable for audio transformation into coefficient frame output for useful exploitation by the invention. Processes chain 2002 includes four variations from a common base of Autocorrelation 2002*a* applied to the audio signal 2001. Autocorrelation can directly provide one of the four outputs of coefficients 2017. The second process of the 2002 family applies Linear Predictive Coding (LPC) 2006 to the output of 2002*a* to output LPC coefficients at 2009. Alternatively, said LPC 2006 values can be further transformed by means of either LSP 2007 or ISF 2008 to further transform the coefficients. In all four cases coefficient outputs are further processed by means of one of two possible quantizations step of 2014 or 2015. The second family of processing is the Mel Frequency Cepstral (MFC) Coefficient process begins with the taking of Log value 2003 of the audio then further processing by means of the MFC process 2010 prior to the final quantization step of either 2014 or 2015. The Wavelet 2004 transform can be used with a suitable coefficient generation step 2011 and finally the Modified Discreet Cosine Transform 2005 process can produce candidate cue sets (coefficient frames) by means of direct Coefficient Generation 2012 or by means of Bit Derivation (2013) producing a Hash String output. In all but output 2013, the coefficients are quantized by either a linear process 2014 or by means of vector quantization 2015 then output from the system at 2016. In all of these processes, audio is transformed into high-entropy coefficient sets representing frames of audio with near stationary power spectrum for the duration of the audio frame hence generating coefficient that can be appropriately hash indexed and applied to a search and scoring means of Path Pursuit providing the potential for accurate and continuous identification of audio segments.

Figure 13:
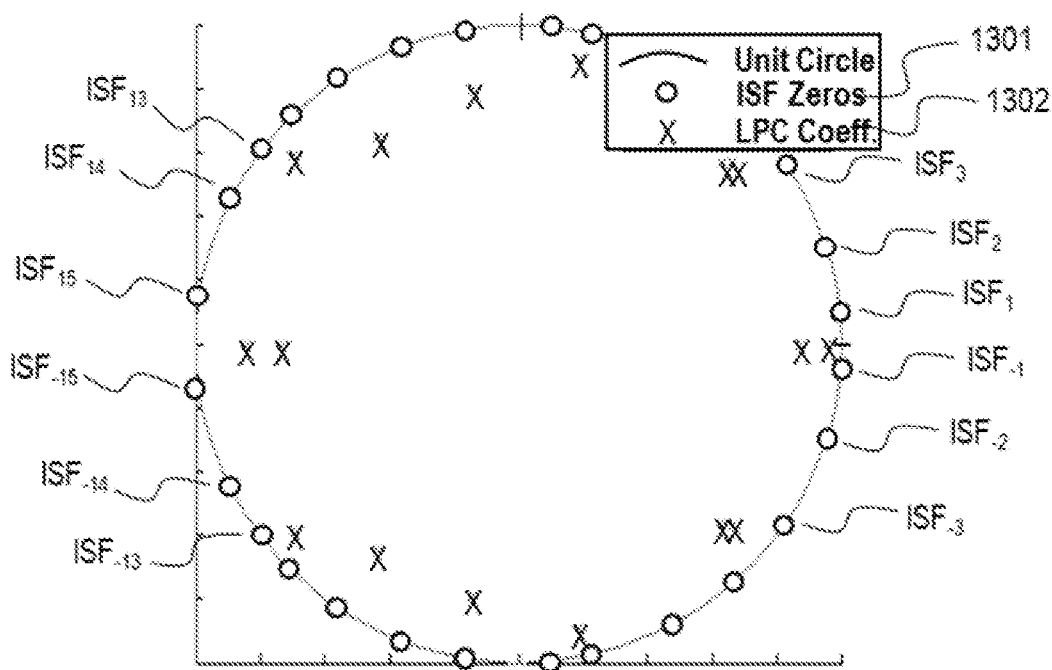
FIG. 13 is a polar plot of ISF Coefficient mapping of the coefficient output of the ISF process to the complex-plane (Z plane) unit circle. The ISF coefficients exist in symmetrical conjugate pairs and only the first half of the unit circle contribute to the output values. The poles (x's) of the LPC that formed the input to the ISF process are shown within the circle.
Figure 14:
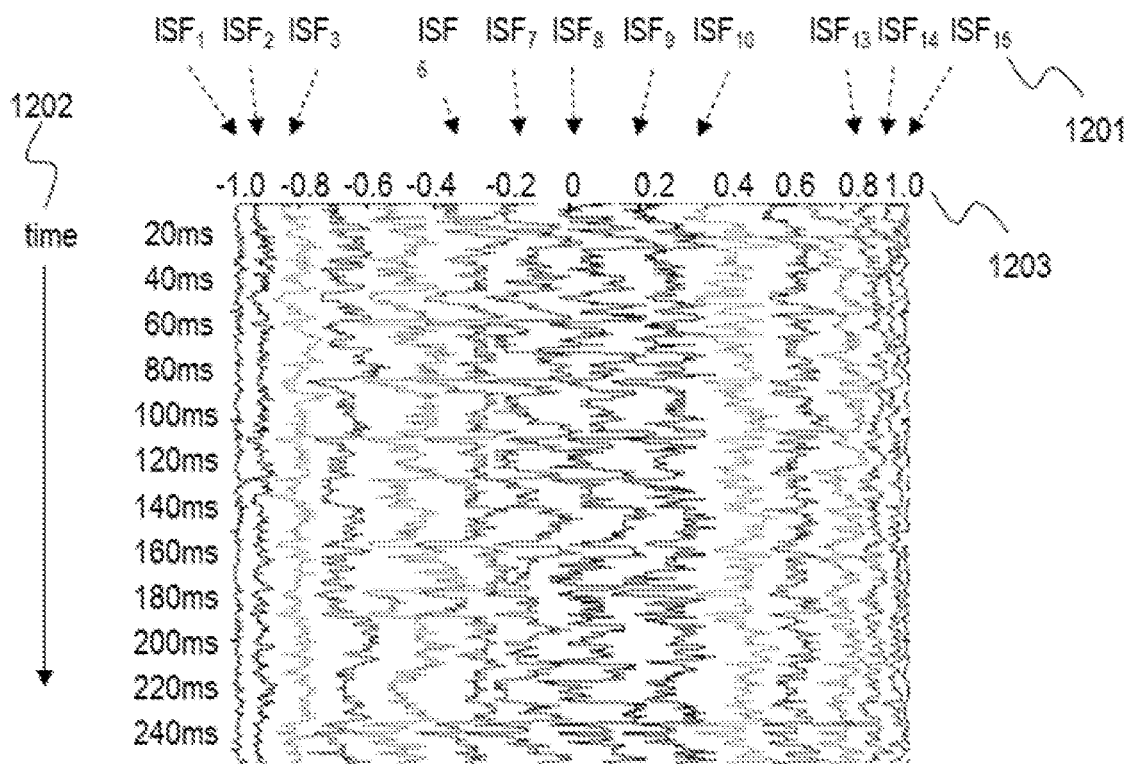
FIG. 14 is a chart of 15 of ISF coefficients graphed over time showing relative sensitivity of unmodified transformed outputs relative to position 1203 on the unit circle of a Z-axis plot.

FIG. 13 is a graph of the coefficients of the LPC process as poles of a Z-plane process represented by X's 1302. The transformation of LPC coefficients to ISF coefficients results in zeros about the unit circle 1301. FIG. 14 is a graph of the ISF coefficients over time illustrating their high entropy and hence suitability for a path pursuit-like matching process. It should be noted that in another embodiment of the invention, the audio conversion process of the invention can function utilizing only LPC output coefficients and not employing the step of conversion to LSP or equivalent ISF coefficients as this LSP/ISF step was developed in prior art primarily for improving audio quality in vocoder applications. It has been found that certain improvements in audio quality may not measurably improve the accuracy of an audio matching system.

Figure 15:
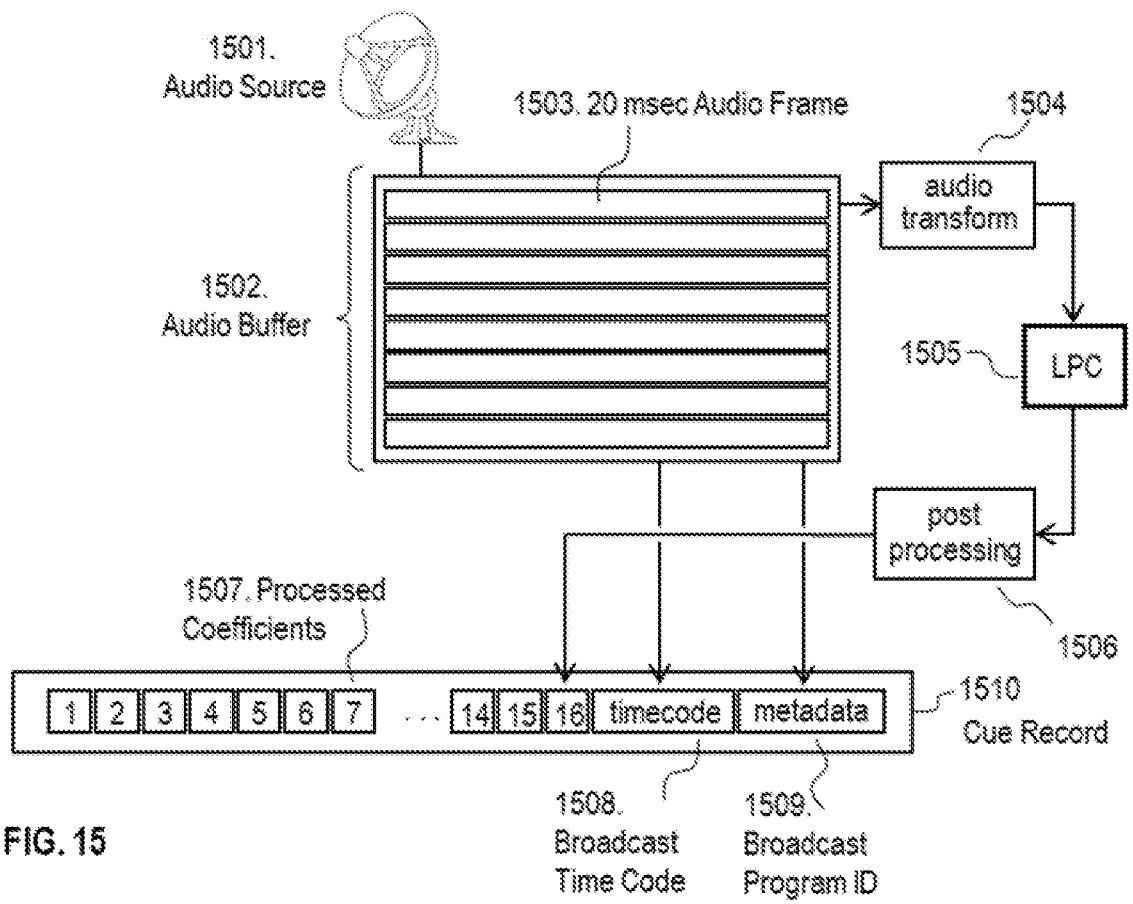
FIG. 15 Ingest process of audio source 1501 decoded into receiver/decoder audio buffer 1502, then segmented into audio frames of a fixed length 1503. Audio frames are transformed 1504 by means of, in this embodiment, autocorrelation then further processed by Linear Predictive Coding 1505 into coefficients 1505 and yet further processed 1506 into coefficients, in this embodiment, using the ISF transform. Program information metadata 1509 is added to program time-code 1508 to the processed coefficients 1507 to form an audio data cue record 1510.
Figure 16:
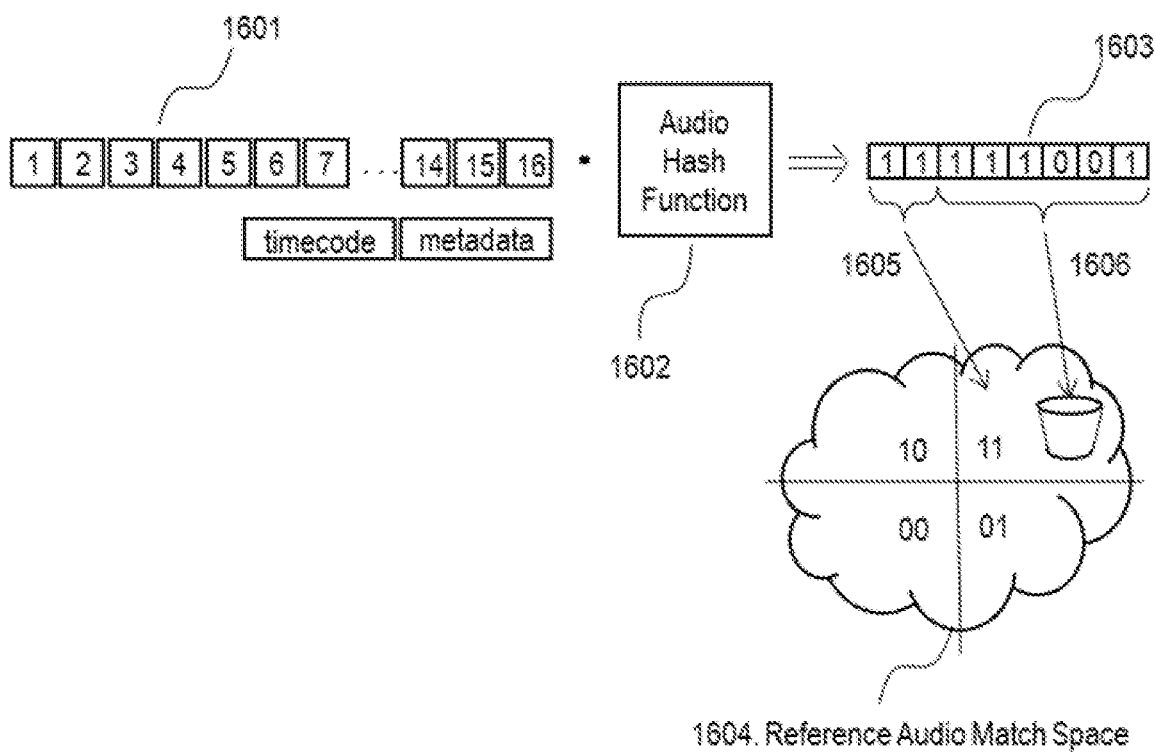
FIG. 16 Diagram of reference audio cue 1601 as hashed by Audio Hash Function 1602 and stored in reference database 1604 indexed by parsing the output of said Hash Function 1602 with most significant bits addressing a storage sector and the remaining bits addressing a "bucket" (location) 1606 within said storage sector.

FIG. 15 shows the formation of an audio cue data set from the coefficient data 1507 with the addition of program time code 1508 and certain program identification information also known as metadata 1509. Once formed, in FIG. 16 the audio cue 1601 is supplied to the media search database where it is processed by an Audio Hash Function 1602 creating hash key 1603 for storage in a search database 1604 where the hash key causes similar audio data cues to be grouped nearby to minimize search distance and hence improve overall system efficiency.

Figure 17:
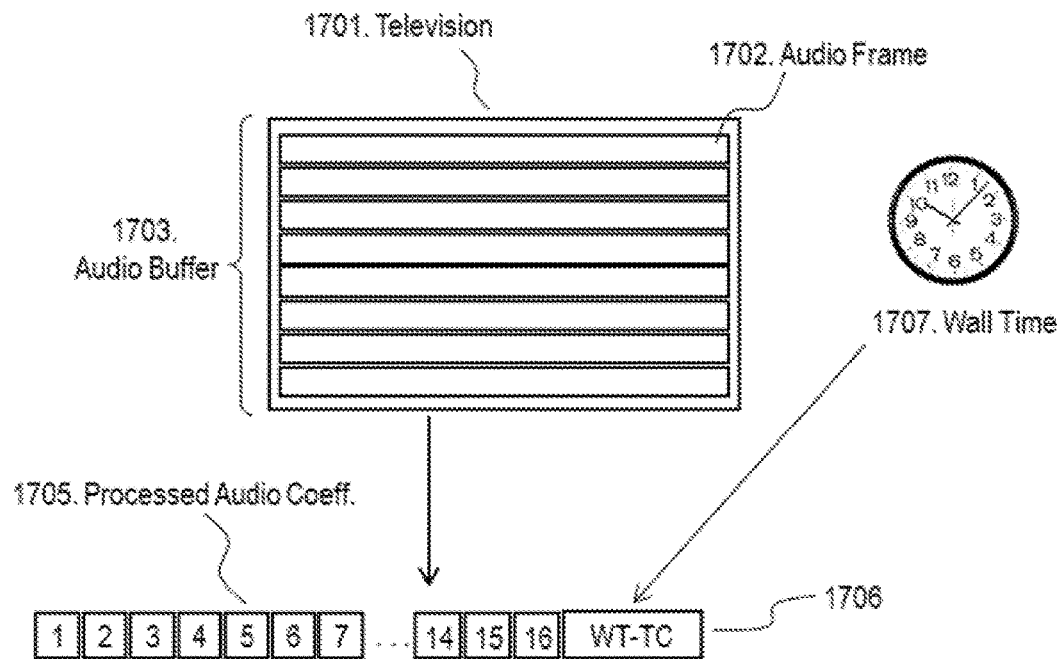
FIG. 17 Diagram of audio cue formation 1706 from an unknown audio source as received by Television Monitor 1701 and decoded in said TV Audio Buffer 1703 then processed by client software of the invention to form Audio Frames of predetermined length 1702 and transformed to coefficients 1705. Said client side cue formation included the addition of the current time of processing 1707 known to the art as "wall time".
Figure 18:
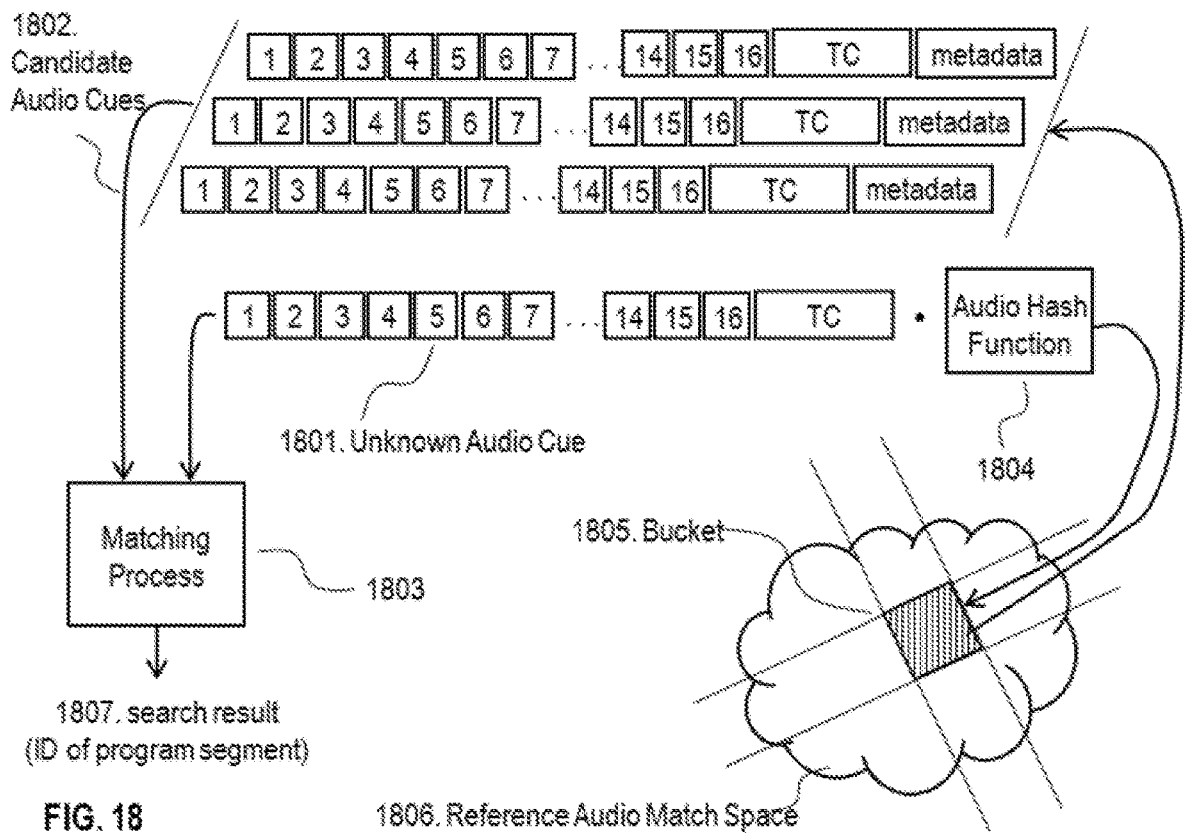
FIG. 18 Diagram of Unknown Audio Cue 1801 generating a hash index by means of Hash Function 1804 then used to address reference database Bucket 1805. Candidate Audio Cues 1802 are retrieved from said database and supplied to Matching Process 1803 which output result 1807 upon a successful matching of unknown media segment to known segment from reference database 1806.
Figure 19:
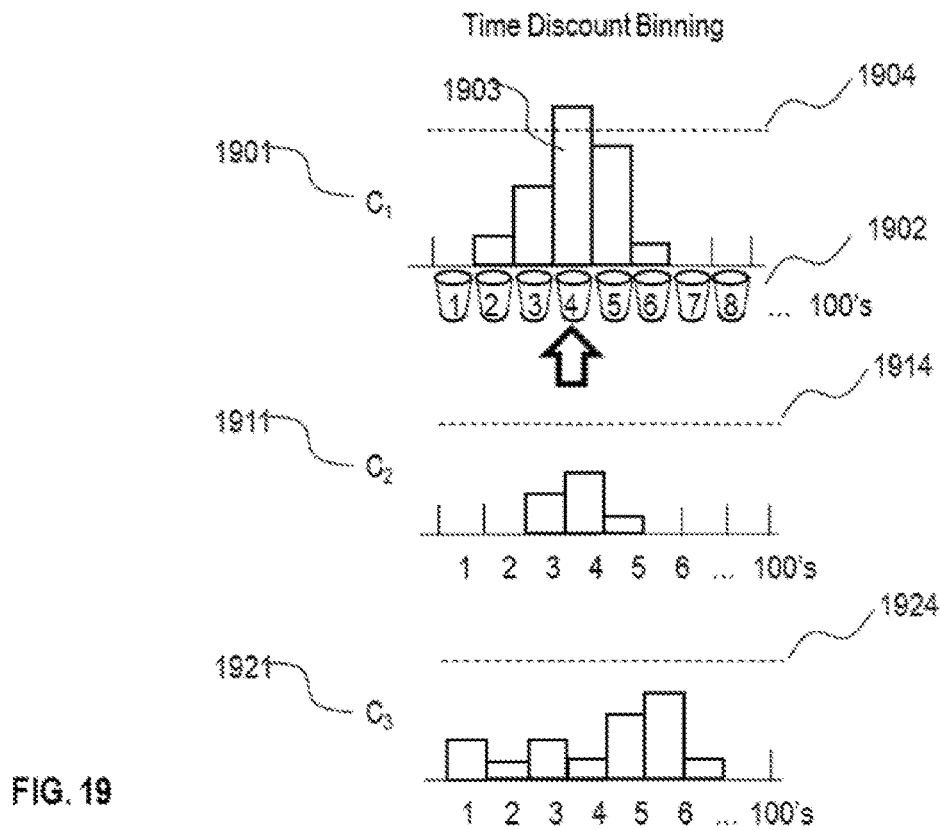
FIG. 19 is a representative diagram of the Time Discount Binning process 1901 that supplies tokens to buckets 1902 until a bucket contains sufficient tokens to cross threshold 1904 indicating a high-probability of, in the invention, a media segment matching result. Said buckets are "leaky" and will drain tokens over time such that consistent results of matches are required within a predetermined time domain to cause tokens to fill respective buckets faster than the rate of leakage in order for tokens in said bucket to successfully cross said threshold.

The client side of the invention is shown in FIG. 17 where a process similar to the enrollment function is generated in the client device 1701. Audio from said client device is process into audio cues 1705 with the addition of the local time 1707, also known as "wall time", added to the cues to provide relative time differences between cues. FIG. 18 shows the unknown data cue addressing the reference media database by means of the same hash function as used to address said database during the enrollment process of the reference media. One or more candidates 1802 are recovered from the database to be supplied to the matching process 1803 as described above. Candidates are evaluated using linear algebraic functions for selecting candidate data by means of evaluating Euclidian distance in high-dimension space such as by means of Probable Point Location in Equal Balls (PPLEB), a process also known as suspect selection. A further step in the process of likely candidate (suspect) selection is carried out by Time Discount Binning (TDB) for a known period. FIG. 19 shows the candidate (suspects) where each is represented by a bucket 1902 allocated after the process of harvesting of said suspect. Said buckets are leaky meaning the tokens have a preset time value and timeout which is the equivalent of a leaky bucket draining over time. As unknown data cues arrive and more suspects are harvested from the reference database, the number of tokens in the bucket that identifies the unknown cues will rise above a threshold value 1904 after a period of three to ten seconds and thus identify the unknown data. This entire process can be understood by reference to the appendix of invention U.S. Pat. No. 8,595,781. An alternative means to score candidate matches can be achieved by the application of correlation of said unknown cue 1801 to one or more candidate cues 1802. Said means of correlation, not to be confused with auto-correlation as used herein, is well known to the skilled person for finding the closest match of a reference data item to one data item of a set of test data items. Hence, said scoring means by the process of mathematical correlation produces a best match by the identification system in place of time discount binning. The process is further illustrated in FIG. 22*a* where each step from Start 2202*a* through 2206*a* Within Range is similar to the processes leading to the above Time Discount Binning of FIG. 22. At step 2207*a*, the Correlation process is applied in placed of creating token bins. Step 2209*a* selects the closest fit from the Correlation process 2207*a*. The winning values is further evaluated by 2211*a* and, if positive, the candidate token identification is output as the result 2212*a*.

The process described above is one of many embodiments of the invention. The following description is the means of the invention by which coefficients are generated from the audio signal and common to most embodiments.

The invention reveals that Linear Predictive Coded (LPC) coefficients and their variants can be used in place of feature vectors or fingerprints for reliable detection of audio segments typically within a few seconds of analyzing unknown audio signals. The theory underlying LPCs is well understood and practiced in signal communications systems as a fundamental process of transcoding audio signals for packet-based digital communications systems. A subset of the common processes is used for the invention. The rationale behind the processes selected is provided along with a detailed description of the many steps to produce coefficients beneficial for automated content recognition (ACR).

Referring again to FIG. 4, which illustrates a simplified block diagram of the process of processing audio from a TV Audio 401 source; is should be understood that the audio signal processing steps 402 to 409 through to the application of processed audio to an Audio Matching System 410 is the same for the enrollment process of adding known audio segment cues to a reference database 307 of FIG. 3 as it is for processing audio from, for example, a client smart TV and submitting said audio segment cues via a network, such as the Internet, to said Audio Matching System 410 for determining the identity of said unknown segments of cue values.

Figure 5:
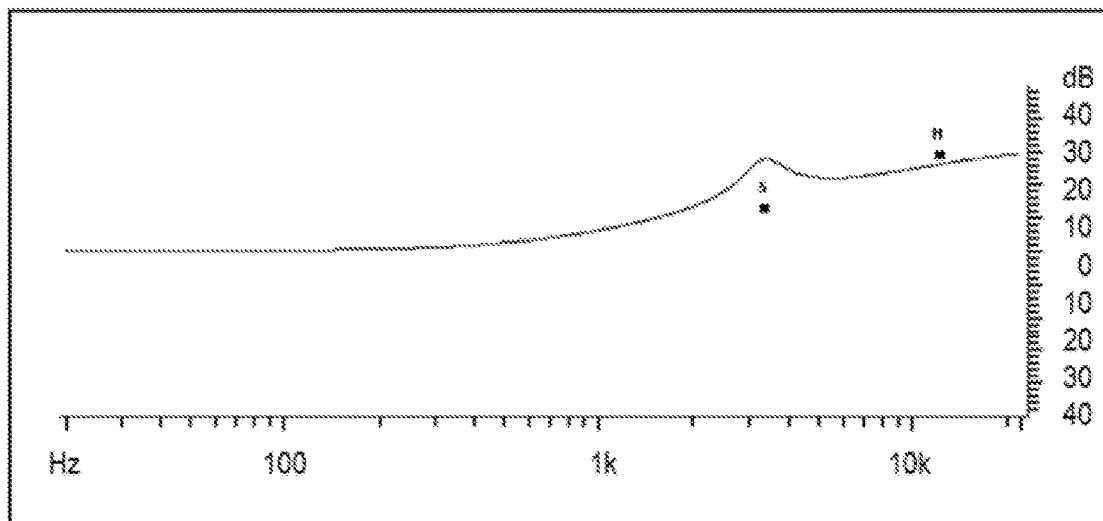
FIG. 5 is a graph of the frequency response of an audio pre-emphasis filter to enhance the information content of high-frequency audio components.

In more detail of the many steps to applying said audio representations to an Audio Matching System 410, certain necessary Pre-Processing 402 steps are applied to the audio which may include stereo to monaural conversion, down or up-sampling of the audio followed by Pre-emphasis (whitening) 403 then Framing, Shaping and Overtapping 404 where the audio is segmented into frames of 20 to 100 milliseconds then a triangle window function 805 of FIG. 8 is applied to the signal of each frame, such as 701 of FIG. 7, to mitigate the abrupt start and stop of the signal within the frame boundary. The final step of 404 is the overlapping of frames by, in this embodiment, 50%. The overlapping is typically achieved by, in the current example of 50%, as seen by 701 to 704 of FIG. 7, by starting a next audio frame at the half-way point of the audio of the previous frame such that the first one-half of the next frame is the same audio as the last one-half of the previous frame, and so on. This process accommodates alignment differences between the reference database of known audio segments and the unknown audio segments as received by the matching system server means 306 of FIG. 3. The pre-processed digital audio is the passed through an Autocorrelation process 405 in preparation for the conversion to the Linear Predictive Coding (LPC) process 406. As audio passes through the block 406, it is evaluated by the Z-plane transform $1/A(z)$. The key to usefulness of this process in matching unknown audio segments to a reference audio segment database, lies in the fact that the LPC transforms the time-domain audio into a power spectral representation in the frequency domain, much like a Fourier Transform but in a Laplacian mode. Hence, the resulting transformed audio information is quasi-stationary with respect to its power spectral density, remaining relatively unchanged for at least tens of milliseconds. The transfer function $1/A(z)$ is an all-pole representation of the full-bandwidth audio transfer function. $A(z)$ is a set of coefficients for a polynomial in the z domain where z represents $e^{\wedge(-i\omega t)}$. In a preferred embodiment, for wideband audio encoding, a 16th order LPC (LPC 16) polynomial is employed. Higher-order polynomials can be employed up to at least LPC 48. Higher-order polynomials are further advantages by the application of the audio-band re-Emphasis 403 when applied to the audio prior to the LPC process. Yet a further improvement of relative high entropy distribution among the coefficients is the application of an LP Weighting function such as 1001 as applied to a representative LP Spectrum 1002 of FIG. 10. In one embodiment of the encoder, segments of audio of 20 milliseconds in duration are analyzed and converted into a set of 16 coefficients representing the channel information of, for example, an audio signal with a bandwidth of 8 kHz. In another embodiment of the encoder, segments of audio of 100 milliseconds and a frequency bandwidth of 16 kHz are converted into sets of 48 coefficients. FIG. 5 shows an exemplary pre-emphasis filter providing pre-emphasis to the audio prior to processing by the LPC transform. FIG. 6(A) shows the spectral characteristics of the audio prior to the pre-emphasis and (B) shows the audio spectrum post the pre-emphasis step. The particular filter of FIG. 5 affords a +15 dB boost of the frequencies from 1 kHz to the top of the audio band which is 16 kHz in this embodiment.

The continuous frames of coefficients generated by the LPC process of the invention can serve in place of fingerprints, as used in the prior art, for an audio matching means where the processes of Path Pursuit provides the matching mechanism. When the LPC process is used in audio vocoders, such as for audio communications, said LPC's excitation encoding sub-process provides two values per each 20 millisecond frame which are a codebook representation of the waveform and an amplitude of the signal. An iterative algorithm is used to convert said excitation into the codebook and is computationally large (expensive). Comparatively small changes in codebook values result in large improvements in perceived speech quality and, hence, the process is of value to audio communications systems. However, for audio matching systems, small differences in codebook values do not result in the large Euclidian distances between coefficients desired for audio matching applications. Due to the large processing demands and sub-optimal distance characteristics of the codebooks, said excitation parameters do not benefit the invention and are, hence, not used.

In one embodiment, the LPC coefficients are not used directly from the output of the 1/A(z) model. Audio codecs for typical audio communications have led to computationally efficient processing means. In a widely used embodiment, the LPC coefficients are calculated using an iterative algorithm using forward and backward prediction called Levinson-Durbin. An appealing attribute of this method is that reflection coefficients are easily derived as a byproduct. These coefficients are used to produce lattice filters for the synthesis and prediction filters. This filter topology also offers robust performance with low sensitivity to coefficient precision which is an useful attribute also for audio matching systems.

Hence, the invention does not require all of the steps used for voice communications applications of LPC and thus useful coefficients can be produced by means of a subset of said steps. In one embodiment, an example of the reduced steps follows:

Capture 320 audio samples, 20 milliseconds at 16 kHz sample rate (SR)
Or, capture 320 audio samples, 10 milliseconds at 32 kHz SR
Or, capture 2400 audio samples, 50 milliseconds at 48 kHz SR
There is no need for high-pass filter, typically set at 50 Hz, as this process is already done on TV audio before transmission
Perform pre-emphasis of 4 kHz HPF resulting in a boost of +25 dB at 16 kHz
Perform a 50% overlapping of audio frames
Auto-correlation on the audio outputs 16, 32 or 48 coefficients
Levenson-Durbin calculates 16 or 32 or 48 LPC coefficients The audio inputs from a typical source as found in, for example, a smart TV, are stereo and are transmitted at a sample rate of 48 kHz. For processing sample rates less than the received rate of 48 kHz, audio down-conversion is performed by low-pass filtering to eliminate frequency components above the Nyquist frequency which is two times the frequency of interest, followed by a decimation process to convert said audio down to the desired sample rate. For example, to convert from 48 kHz to 16 kHz requires a low-pass filter to eliminate frequency components above 8 kHz. The filter output is then decimated by a factor of three to convert to the lower sample rate of 16 kHz. It is also obvious that, for automated content recognition, stereo inputs are not necessary for good audio detection. The stereo input is therefore converted to monaural by combining the left and right channels, or alternatively, either the left or right channel can be used as a sole representative monaural channel.

To improve the distribution of the power spectrum, a whitening filter is then added to the data path of the invention. Said filter boosts frequencies above 4 kHz by up to 20 dB at the top frequency. Each 20 milliseconds of audio (320 samples at 16 kHz) is packaged as a frame.

A simple triangle windowing function is applied to each audio frame to prepare the audio frames for LPC processing. Frame shaping is needed to reduce spurious signal generation at the edges due to the abrupt start and stop of the signal in each frame. Typically, a Hamming-like function is employed to maximize audio fidelity. However, as fidelity of encoding is not important to the process of media identification, a simple triangle function is all that is needed for the invention.

Figure 9:
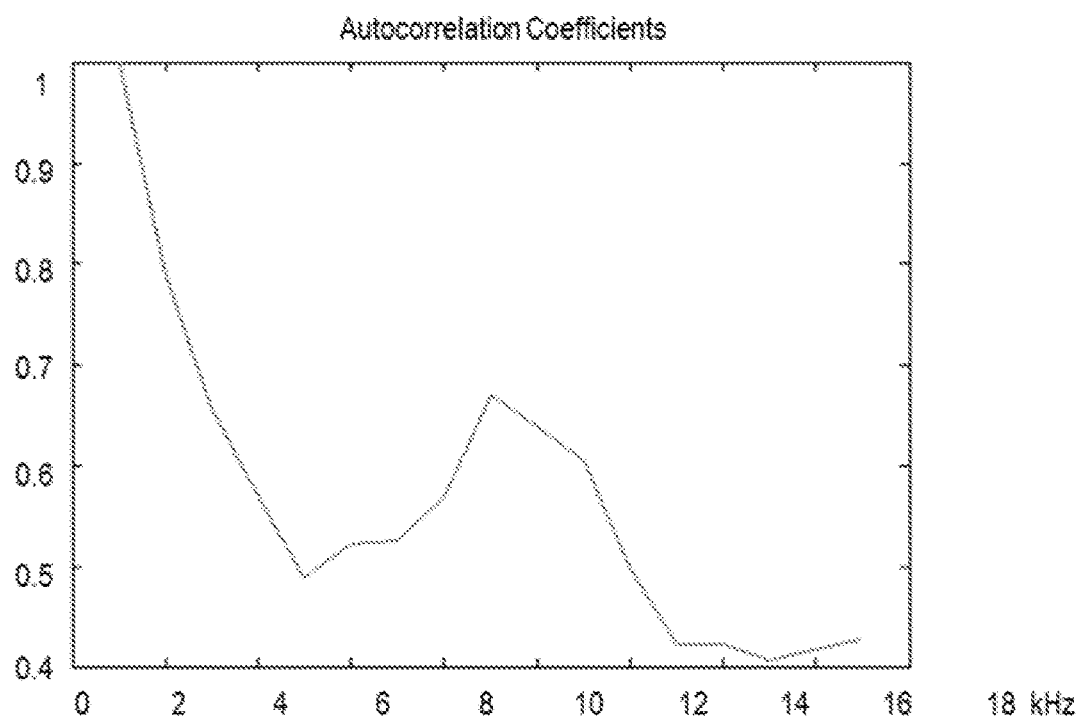
FIG. 9 is a plot of the coefficient output of an autocorrelation function as employed by the invention and applied to typical television audio.
Figure 11:
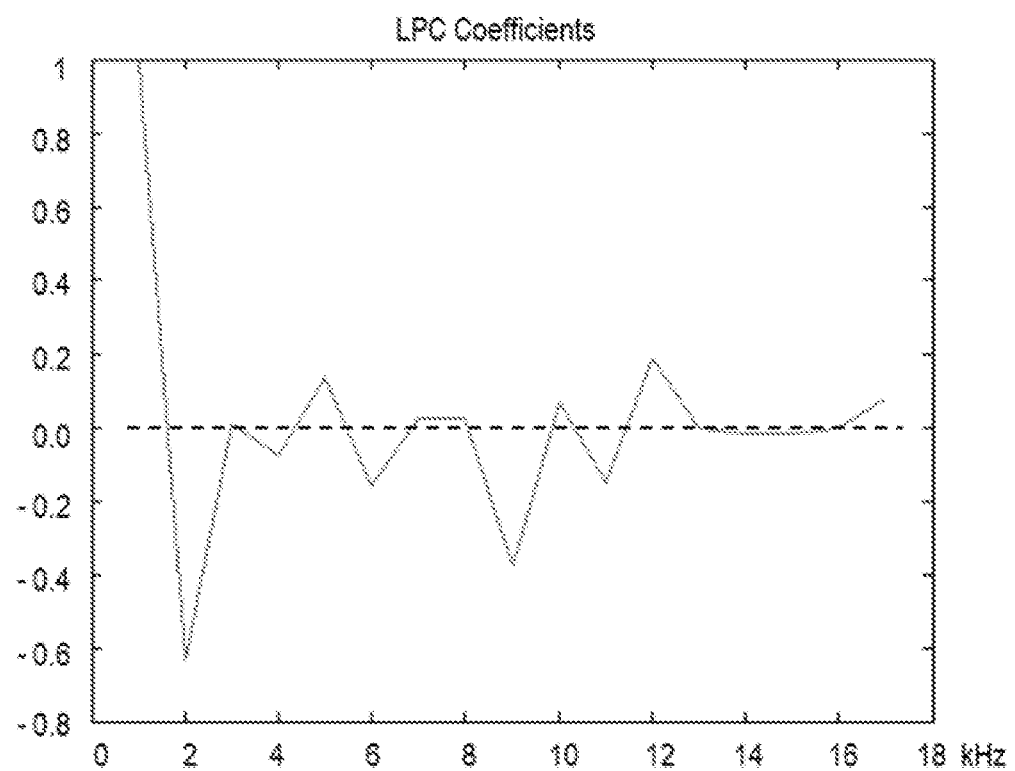
FIG. 11 is a plot of the coefficient output of an LPC process of the autocorrelation output of FIG. 10 showing typical values of a 20 msec audio sample of a speech signal.

Levenson-Durbin calculates the LPC coefficients using the autocorrelation of the audio samples for input to the LPC function. Levenson-Durbin is used to calculate 16 coefficients in addition to a leading "1" for a total of 17 values per frame from 17 autocorrelation lags, 0-16. The details of said coding are well known to the skilled person. Because a DC component is not present in the audio, as discussed above, the autocorrelation function is equivalent to the covariance of the signal. Inversion of the covariance matrix results in an all-pole representation of the signal channel. Any method of matrix inversion such as Gauss elimination or Cholesky decomposition can be used. The matrix is by definition real-valued and symmetric about the diagonal, also known as a Toeplitz matrix. Levenson-Durbin uses iterative forward/backward estimation recursively to calculate the roots. This approach is used almost universally in LPC analysis. Not only is said approach numerically stable and computationally efficient, but it also provides the reflection coefficients as a by-product with little extra computation. A lattice filter representation of the channel using the reflection coefficients is especially well suited to fixed-point implementation and is used throughout the general purpose vocoder and can be beneficially employed by the invention. Shown in FIG. 9 in one embodiment of the invention are the autocorrelation coefficients taken from a 20 millisecond audio segment. The FIG. 11 shows the LPC coefficients calculated from the autocorrelation values.

Figure 12:
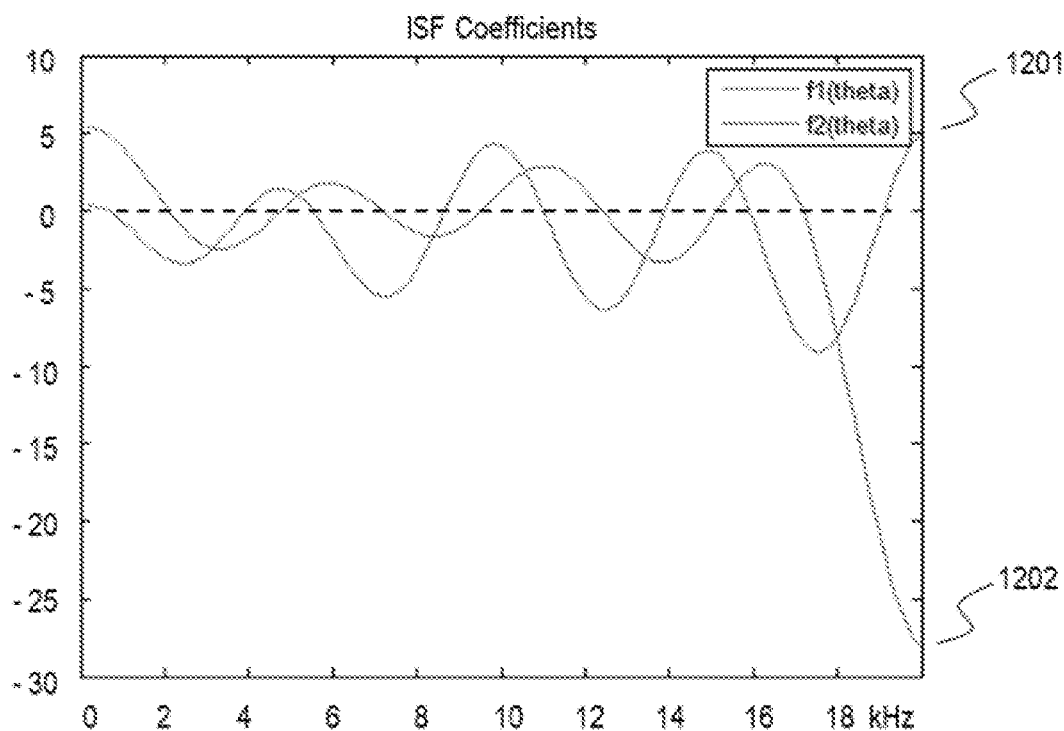
FIG. 12 Result of LPC coefficient output of FIG. 11 transformed to Immittance Spectral Frequencies (ISF) coefficients. It is well known to the art that a suitable alternative exists employing the Line Spectral Pairs (LSP) transform which produces similar coefficients where both ISF and LSP coefficients can be more suitable for quantization that the unprocessed coefficients of the LPC process.

In another embodiment, it may be found to be beneficial to follow the LPC process with further processing in the form of the conversion of said LPC coefficients to either Line Spectral Pairs (LSP) or the equivalent Immittance Spectral Frequencies (ISF) as shown in FIG. 12. The IFS are derived from the LPC coefficients by first creating symmetric and anti-symmetric functions f1' and f2' of the same order as the LPC filter from the LPC coefficients:

$$f'_1(z)=A(z)+z^{-16}A(z^{-1}) \text{ and } f'_2(z)=A(z)-z^{-16}A(z^{-1})$$

The roots of these two equations lie on the unit circle and are the ISFs. Like the LPC coefficients, the roots of f1 and f2 are conjugate symmetric and only those on the upper half of the unit circle need to be evaluated. Exploiting this symmetry, two new functions f1 and f2 are created. F1 simply consists of the first 8 coefficients of f1'. F2 consists of the first 7 coefficients of f2' filtered using a difference equation to remove the roots at 1 and −1. The roots of f1($z$)=0 and f2($z$)=0 are the ISFs. The roots of these functions can be found using classical methods such as Newton-Raphson or LaGuerre polynomials. However, due to special characteristics of these polynomials, a computationally efficient approach using Chebyshev polynomials may be used.

Using the approach above, f1 and f2 for the LPC coefficients for the example are shown in FIG. 14. The zero crossings of f1 and f2 are the ISFs. The x axis corresponds to theta, the angle on the unit circle with 0=0 degrees and 100=180 degrees. F1 and f2 are evaluated using only the real component. For example, at x=10, the angle is 18 degrees and the input to f1 and f2 is cosine (18*100/(2*pi)) =0.95106. The zero crossings are the ISF locations, with the ISF=cosine (theta). The first and last zero crossings are roots of f1 and the roots alternate between f1 and f2. An efficient zero crossing detection algorithm was written which exploits these properties to minimize the processing required. FIG. 13 shows the LPC coefficients generated by the Levinson-Durbin algorithm as X's and the resulting ISFs as O's.

A plot over time of said ISF coefficients is found in FIG. 14 illustrating a desirable entropic nature of the coefficients which is largely independent of the underlying audio signal from which said coefficients were indirectly derived. Is should be understood that the LPC coefficients will appear in a plot with similar shape.

It is interesting to note that the reflection coefficients and the ISFs are derived from the autocorrelation coefficients by a series of linear transformations. Although there are divisions in the Levinson-Durbin algorithm and division is not a linear process, they are used only for scaling and, thus, can be construed as multiplicative which is linear. As proof, if omitted from a double precision floating point implementation, the result will be the same. The observation is important because it suggests that the statistical properties of the autocorrelation, LPC coefficients, reflection coefficients, and the ISFs should be very similar. Hence, in yet another embodiment of the invention, the system of the invention can perform automated content recognition of audio content creating coefficient from just the autocorrelation data and not the LPC and not the ISF processes yet further improving the efficiency of the overall ACR system.

It should be understood from the above detailed description that the invention provides a means to convert audio information into semi-stationary frames of audio coefficients useful for the enrollment and identification data of an automated content recognition system. Said process provides the ability to continuously match audio information from a very large population of audio sources such as smart TVs. With appropriate central server scaling, said population could include tens of millions of devices. In addition, said audio ACR system can be efficiently combined with a video matching system such as taught by Neumeier and Liberty in U.S. Pat. No. 8,595,781 where both audio and video matching processes can share a common central processing architecture such as the path pursuit means of Neumeier. The invention is distinct from the prior art in not employing a fingerprinting means for identification of audio and is more accurate with few false positive results and at the same time much more scalable such that it can be utilized for continuous identification of media and at the same time require a minimum of processing overhead at each client device.

Figure 23:
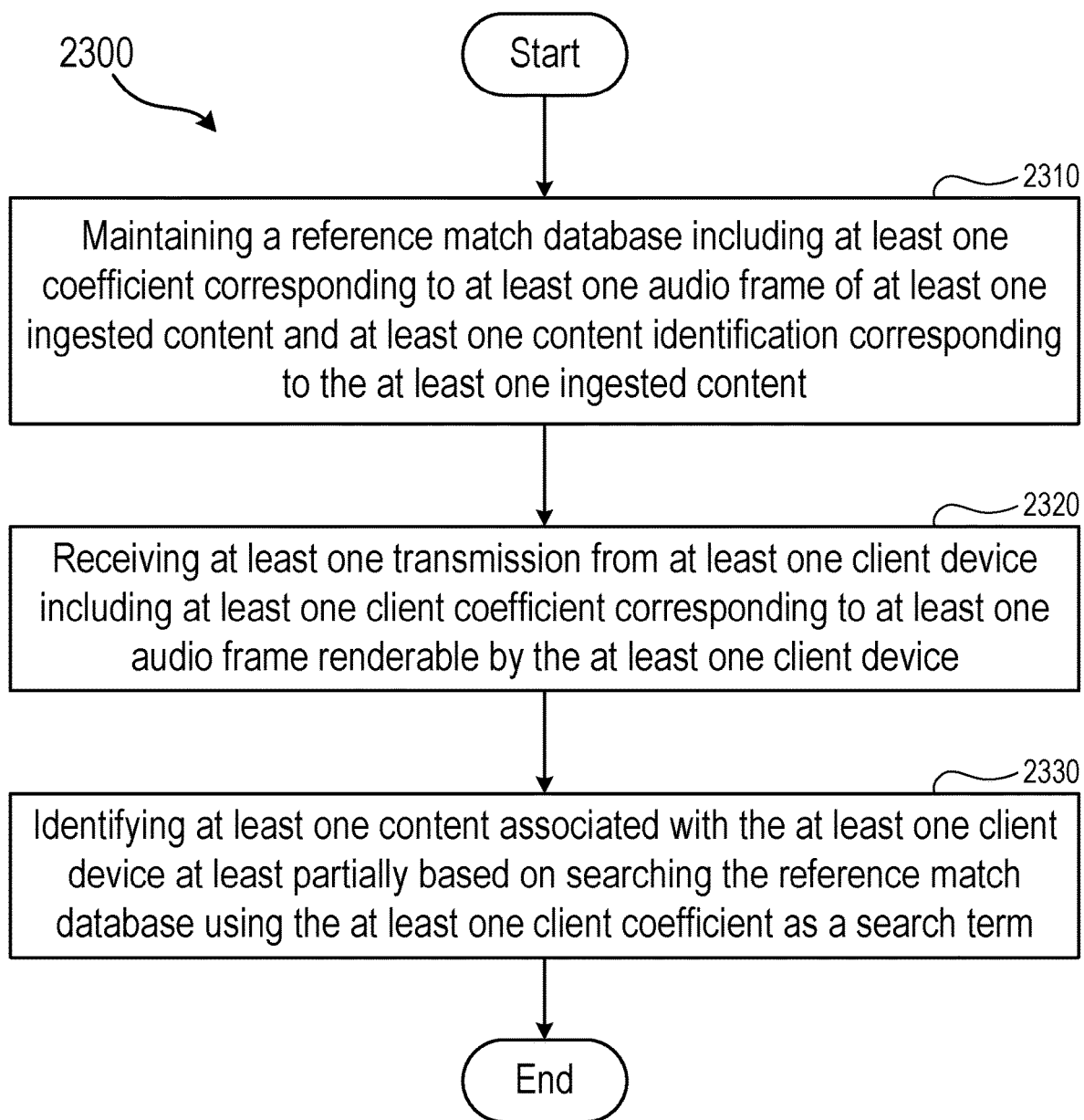
FIG. 23 illustrates an operational flow representing example operations related to continuous audio matching.

FIG. 23 illustrates a system and/or an operational flow 2300 representing example operations related to continuous audio matching. In FIG. 23 and in following figures that include various examples of operational flows, discussion and explanation may be provided with respect to the above-described examples of FIGS. 1 through 22, and/or with respect to other examples and contexts. However, it should be understood that the circuitry, means and/or operational flows may be executed in a number of other environments and contexts, and/or in modified versions of FIGS. 1 through 22. Also, although the various operational flows are presented in the sequence(s) illustrated, it should be understood that the various procedures carried out by the operational flows may be performed in other orders than those which are illustrated, or may be performed concurrently. "Operational flow" as used herein may include circuitry for carrying out the flow. A processing device, such as a microprocessor, may, via execution of one or more instructions or other code-like appurtenances, become "circuitry configured for" a particular operation. An operational flow as carried out by a processing device would render the processing device "circuitry configured for" carrying out each operation via execution of the one or more instructions or other appurtenances.

After a start operation, the operational flow 2300 moves to operation 2310. Operation 2310 depicts maintaining a reference match database including at least one coefficient corresponding to at least one audio frame of at least one ingested content and at least one content identification corresponding to the at least one ingested content. For example, as shown in and/or described with respect to FIGS. 1 through 22, content is supplied to a media ingest operation which produces audio and/or video cue data and provides associated metadata (for example, identification of the received content such as a title, episode, or other identifier). The audio and/or video cue data is stored in a database along with the corresponding identification in real-time (i.e. as the content is received). The audio and/or video data is transformed into values using a particular algorithm, function, and/or set of functions. That particular algorithm, function, and/or set of functions is also used by the client device as it processes audio and/or video data. As the same point in the program content is processed at the ingest operation and at the client device, the resulting audio and/or coefficients will be the same or nearly the same due to the use of the same algorithm, function, and/or set of functions by both the ingest operation and the client device. Rather than storing the entirety of the program content, or just the audio portion of the program content, a frame of audio content is transformed into the much smaller coefficient and stored in conjunction with the identifier. The coefficient would not be able to produce the audio, but would contain sufficient data to be matched with a corresponding coefficient sent by a client device in order to retrieve the associated content identification from the reference match database.

Then, operation 2320 depicts receiving at least one transmission from at least one client device including at least one client coefficient corresponding to at least one audio frame renderable by the at least one client device. For example, as shown in and/or described with respect to FIGS. 1 through 22, as audio and/or video is able to be rendered by the client device (i.e. played over the speaker or other audio output of the client device), the audio and/or video data is transformed at the client device into a coefficient using the same algorithm, function, and/or set of functions used by the ingest operation (not necessarily at the same rate as described elsewhere herein). The resulting coefficient is transmitted, usually via the Internet, to a matching server system which can access the reference match database.

Then, operation 2330 depicts identifying at least one content associated with the at least one client device at least partially based on searching the reference match database using the at least one client coefficient as a search term. For example, as shown in and/or described with respect to FIGS. 1 through 22, the matching server system may use a received coefficient from a client system to retrieve a suspect from the reference match database. A plurality of successive received coefficients is used to retrieve multiple suspects, which are placed in bins correlating to possible program matches. Time discount binning is used through successive database retrievals to determine and/or identify the most likely program being rendered by the client device. The operational flow then proceeds to an end operation.

Figure 24:
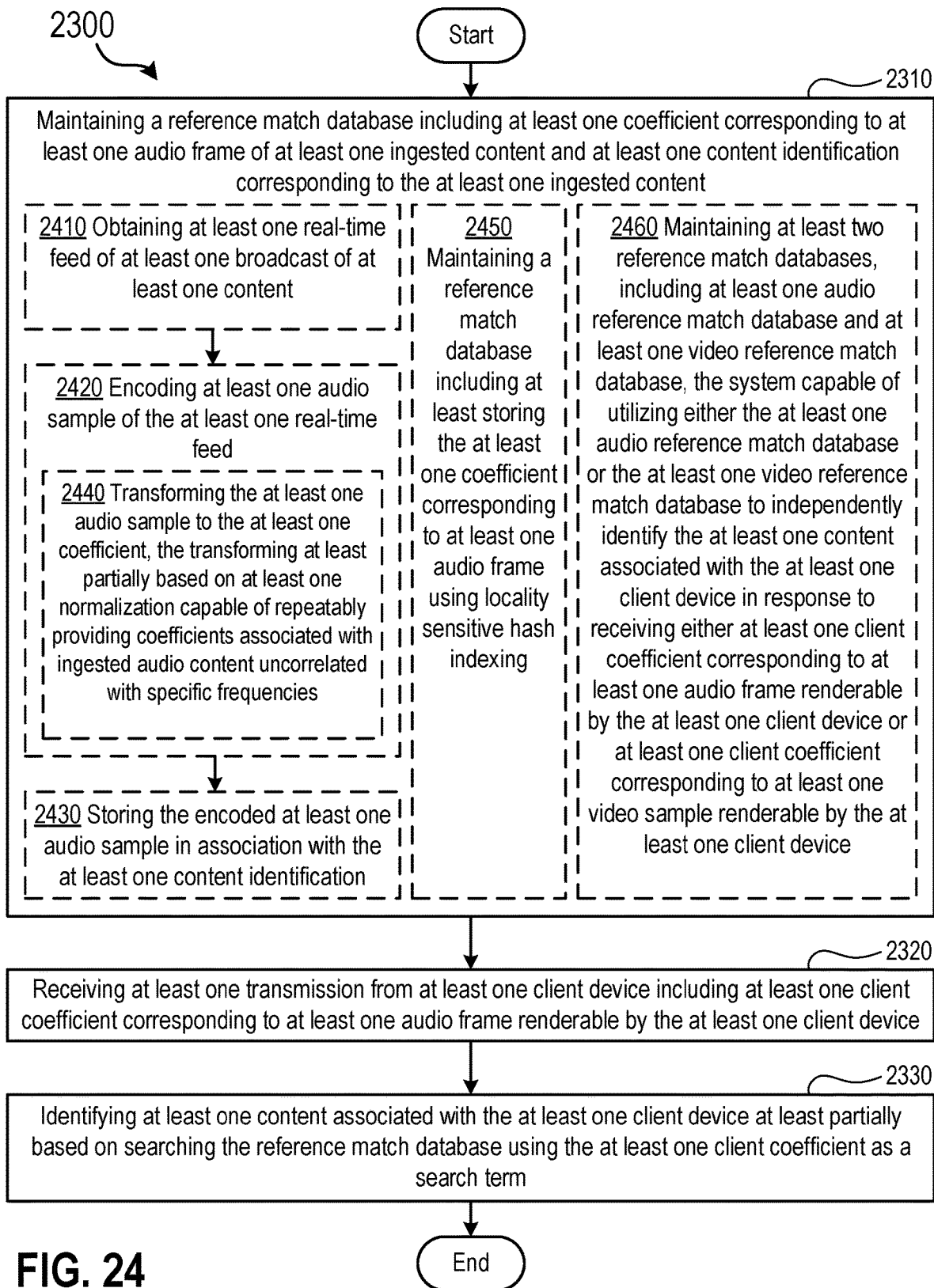
FIGS. 24 to 28 illustrate alternative embodiments of the operational flow of FIG. 23.

FIG. 24 illustrates alternative embodiments of the example operational flow 2300 of FIG. 23. FIG. 24 illustrates an example embodiment where operational flow 2310 may include at least one additional operation. Additional operations may include operation 2410, 2420, 2430, 2440, 2450, and/or 2460.

Operation 2410 illustrates obtaining at least one real-time feed of at least one broadcast of at least one content. For example, as shown in and/or described with respect to FIGS. 1 through 22, the matching server system may retrieve, via a satellite downlink of a network's nationwide broadcast facility, a program. The matching server system may be receiving the contents of multiple channels at once. By downlinking directly from the network's nationwide broadcast facility, the matching server system receives the content in advance of the client devices, due to client latency introduced by additional downlink and retransmission operations by local affiliates, cable operators, network headends, etc.

Then, operation 2420 illustrates encoding at least one audio sample of the at least one real-time feed. For example, as shown in and/or described with respect to FIGS. 1 through 22, audio data for one or many channels is converted to a stream of coefficients for storage in the reference media database. A continuous audio waveform is sampled into a plurality of frames which may occur at, for example, 50 times a second or 20 ms frames. The sample rate is selected to maintain an effectively stationary power spectral density of the audio information within the sample. In some embodiments, overlapping of adjacent audio frames is performed to make up for any mismatch between start times of audio matching by the matching server system and client device. The frame data is then transformed using functions which repeatably result in the same coefficient value as would occur if the audio data were transformed at the client device.

Then, operation 2430 illustrates storing the encoded at least one audio sample in association with the at least one content identification. For example, as shown in and/or described with respect to FIGS. 1 through 22, the coefficient may be stored along with an indication of the name of a program obtained via the ingest arrangement (e.g. satellite feed). The data is stored in a manner to facilitate retrieval of the data by a path pursuit means incorporating leaky buckets and time discount binning of results of successive data retrieval operations.

Operation 2420 may include at least one additional operation. Additional operations may include operation 2440. Operation 2440 illustrates transforming the at least one audio sample to the at least one coefficient, the transforming at least partially based on at least one normalization capable of repeatably providing coefficients associated with ingested audio content uncorrelated with specific frequencies. For example, as shown in and/or described with respect to FIGS. 1 through 22, the transform process may include algorithms and/or functions designed to "spread out" the coefficient values along a range of values in order to maximize the use of the entire range, to make the data appear highly entropic. Without this spreading, coefficients would tend to congregate near a single point along the range of possible values for the coefficients. For example, consider dialogue including a speaker whose voice characteristics include a tone corresponding to a particular frequency. Without the foregoing transformations designed to make the data appear highly entropic, coefficients corresponding to the speaker would tend to gather around one value corresponding to that frequency. Through application of functions disclosed herein, the coefficients instead are spread around their range of possible values, making them appear highly entropic and eliminating any relation of the resulting coefficient to a particular audio frequency. Yet the functions are repeatable in that two different systems (e.g. the matching server system and a client device) operating on the same audio content will output the same or nearly the same coefficient values (note that they do not need to be exactly the same because the subsequent time-discount binning which establishes a likelihood of a match among multiple suspects allows for slight variation in the coefficients corresponding to the same portion of the content).

Operation 2450 illustrates maintaining a reference match database including at least storing the at least one coefficient corresponding to at least one audio frame using locality sensitive hash indexing. In some embodiments, as shown in and/or described with respect to FIGS. 1 through 22, for speedy retrieval of the data a number of most significant bits may indicate a particular database server on which the coefficient and program identification should be stored.

Operation 2460 illustrates maintaining at least two reference match databases, including at least one audio reference match database and at least one video reference match database, the system capable of utilizing either the at least one audio reference match database or the at least one video reference match database to independently identify the at least one content associated with the at least one client device in response to receiving either at least one client coefficient corresponding to at least one audio frame renderable by the at least one client device or at least one client coefficient corresponding to at least one video sample renderable by the at least one client device. In some embodiments, as shown in and/or described with respect to FIGS. 1 through 22, a system may receive video ingest in addition to audio ingest, facilitating identification of a program using either or both of a stream of audio coefficients and/or a stream of video coefficients, which may serve to provide more robust matching by confirming an identification made using audio coefficients using the video coefficients, or providing an ability to switch between audio and video matching as needed if the signals are interrupted.

Figure 25:

FIG. 25 illustrates alternative embodiments of the example operational flow 2300 of FIG. 23. FIG. 25 illustrates an example embodiment where operational flow 2320 may include at least one additional operation. Additional operations may include operation 2510, 2520, 2530, and/or 2540.

Operation 2510 illustrates receiving at least one transmission from at least one client device, the at least one client device including one or more of at least one television, at least one smart television, at least one media player, at least one set-top box, at least one game console, at least one AV receiver, at least one Internet-connected device, at least one computing device, or at least one streaming media device. For example, as shown in and/or described with respect to FIGS. 1 through 22, a widget may operate on the client device to transform an audio stream renderable on the client device into a stream of coefficients for sending to a matching server system. Many client devices render content and have the ability to perform data processing tasks simultaneously. In some instances the client action can occur on a smart television; in different embodiments the client action occurs on a set-top box (a cable or satellite receiver, e.g.) which receives the content and provides it to a television for playback.

Operation 2520 illustrates receiving at least one transmission stream from at least one client device, the at least one transmission stream including at least one sequence of client coefficients associated with one or more of at least one audio frame or at least one video frame renderable by the at least one client device to identify at least one content renderable by the at least one client device, the at least one sequence including at least some audio client coefficients. For example, as shown in and/or described with respect to FIGS. 1 through 22, the client device of the invention sends coefficients corresponding to samples of the audio content to the matching server system, the generation of coefficients and sending occurring at a particular interval (which may be periodic or aperiodic and can be altered mid-stream). The client device may additionally send coefficients produced using pixel data from the content received by the client device, but the invention disclosed herein at least sometimes sends audio coefficients irrespective of whether video coefficients are sent.

Operation 2530 illustrates receiving at least one transmission from at least one client device including at least one client coefficient corresponding to at least one audio frame renderable by the at least one client device, the at least one client coefficient corresponding to at least one audio frame renderable by the at least one client device determined at least partially via at least one transform identical to at least one transform utilized in maintaining the reference match database. For example, as shown in and/or described with respect to FIGS. 1 through 22, the client device uses the same transform function as is utilized by the matching server system (although not necessarily as the same rate as disclosed elsewhere herein) to obtain coefficients corresponding to audio content about to be played over the speaker or audio out of the client device. The two systems using the same transform mean that at the same point in the program content, the resulting coefficient values produced by the client device and the matching server system will be substantially the same (subject to the overlap function which aligns audio frames in instances where the framing begins at a different time offset on the two systems).

Operation 2540 illustrates receiving at least one transmission from at least one client device including at least one client coefficient corresponding to at least one audio frame renderable by the at least one client device, the at least one client coefficient corresponding to at least one audio frame renderable by the at least one client device determined at least partially via sampling at least one audio stream into one or more frames and overlapping the one or more frames previous to normalization of the overlapping one or more frames. For example, as shown in and/or described with respect to FIGS. 1 through 22, overlapping of the frames aligns the audio frames in instances where the framing begins at a different time offset on the client device than it did on the matching server system which could occur when, for example, the client device is tuned to a new channel in the middle of a program being broadcast.

Figure 26:
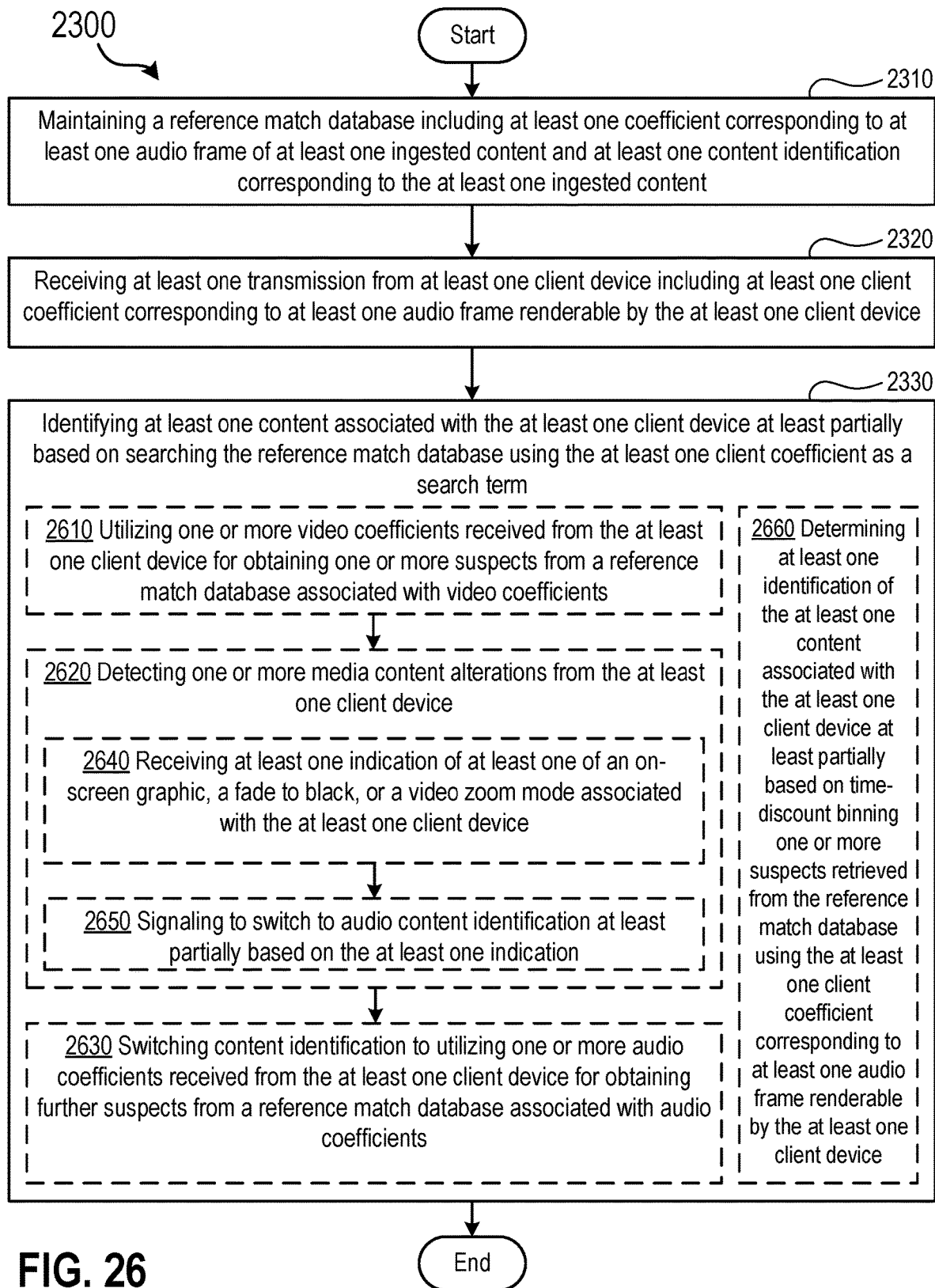

FIG. 26 illustrates alternative embodiments of the example operational flow 2300 of FIG. 23. FIG. 26 illustrates an example embodiment where operational flow 2330 may include at least one additional operation. Additional operations may include operation 2610, 2620, 2630, 2640, 2650, and/or 2660.

Operation 2610 illustrates utilizing one or more video coefficients received from the at least one client device for obtaining one or more suspects from a reference match database associated with video coefficients. For example, as shown in and/or described with respect to FIGS. 1 through 22, a path pursuit algorithm obtains a plurality of suspects corresponding to successive video coefficients received by the matching server system. Video matching may function provided that the client device is producing an unaltered display of the content; activation of an on-screen menu or television zoom mode, or an on-screen graphic such as a watermark added by a local broadcaster, may cause the video matching to fail.

Then, operation 2620 illustrates detecting one or more media content alterations from the at least one client device. For example, as shown in and/or described with respect to FIGS. 1 through 22, the matching server system may detect that a probability of a particular bin identifying a correct program is below a particular threshold to declare a particular bin the likely content-identifying bin. This could occur when received video coefficients sent while an on-screen channel guide is active insufficiently match coefficients in the database. Alternatively, the widget of the client device could detect the activation of the on-screen channel guide and initiate transmission of the audio coefficients or signal the matching server system of the activation.

Then, operation 2630 illustrates switching content identification to utilizing one or more audio coefficients received from the at least one client device for obtaining further suspects from a reference match database associated with audio coefficients. For example, as shown in and/or described with respect to FIGS. 1 through 22, the matching server system upon interference with video matching occurring (detection and or signaling relating to the on-screen channel guide, for example) can switch to using matching with the audio coefficients, because the audio signal is typically not interrupted by an on-screen channel guide, or added watermark, or other interference with on-screen video (i.e. media content alteration).

Operation 2620 may include at least one additional operation. Additional operations may include operation 2640 and/or operation 2650.

Operation 2640 illustrates receiving at least one indication of at least one of an on-screen graphic, a fade to black, or a video zoom mode associated with the at least one client device. For example, as shown in and/or described with respect to FIGS. 1 through 22, as discussed above, the matching server system may detect a particular media content alteration such as an on-screen graphic, a fade to black, or a video zoom mode which would interfere with matching using video coefficients. Such detection may take place when the content matching is unable to match a program with sufficient certainty, likelihood, and/or probability. Alternatively, a client device could signal the matching server system that a media content alteration such as a zoom mode is occurring. Such a signal could cause the matching server system to begin using the audio coefficients.

Then, operation 2650 illustrates signaling to switch to audio content identification at least partially based on the at least one indication. In some embodiments, as shown in and/or described with respect to FIGS. 1 through 22, in instances where video matching is not working, the system may switch to identification using audio coefficients. In some instances, leaky buckets created in association with video matching are re-created and time discount binning begins anew upon the switch to audio matching. In other instances, the content matching operation leaves the suspects from the video matching in the existing bins and begins adding suspects from the audio matching to the bins such that, in the time intervals immediately following the switch to audio, a bin may have both video suspects and audio suspects, where the video suspects may leak from the buckets first but both video and audio suspects will be used to declare an identification.

Operation 2660 illustrates determining at least one identification of the at least one content associated with the at least one client device at least partially based on time-discount binning one or more suspects retrieved from the reference match database using the at least one client coefficient corresponding to at least one audio frame renderable by the at least one client device. In some embodiments, as shown in and/or described with respect to FIGS. 1 through 22, upon receipt of an audio coefficient from a client device, it is used as a search query of the reference media database. One or more suspects corresponding to the audio coefficient are retrieved, each of which linked to a particular program identifier. The suspects are placed in bins assigned to particular programs. The process is repeated with each successive received audio coefficient and a bin receiving the most suspects most likely corresponds to the program being viewed. The oldest suspects are removed over time (i.e. the "leaky buckets") and when a channel is changed on the client, suspects begin going in different bins responsive to the different audio coefficients produced by the channel change.

Figure 27:
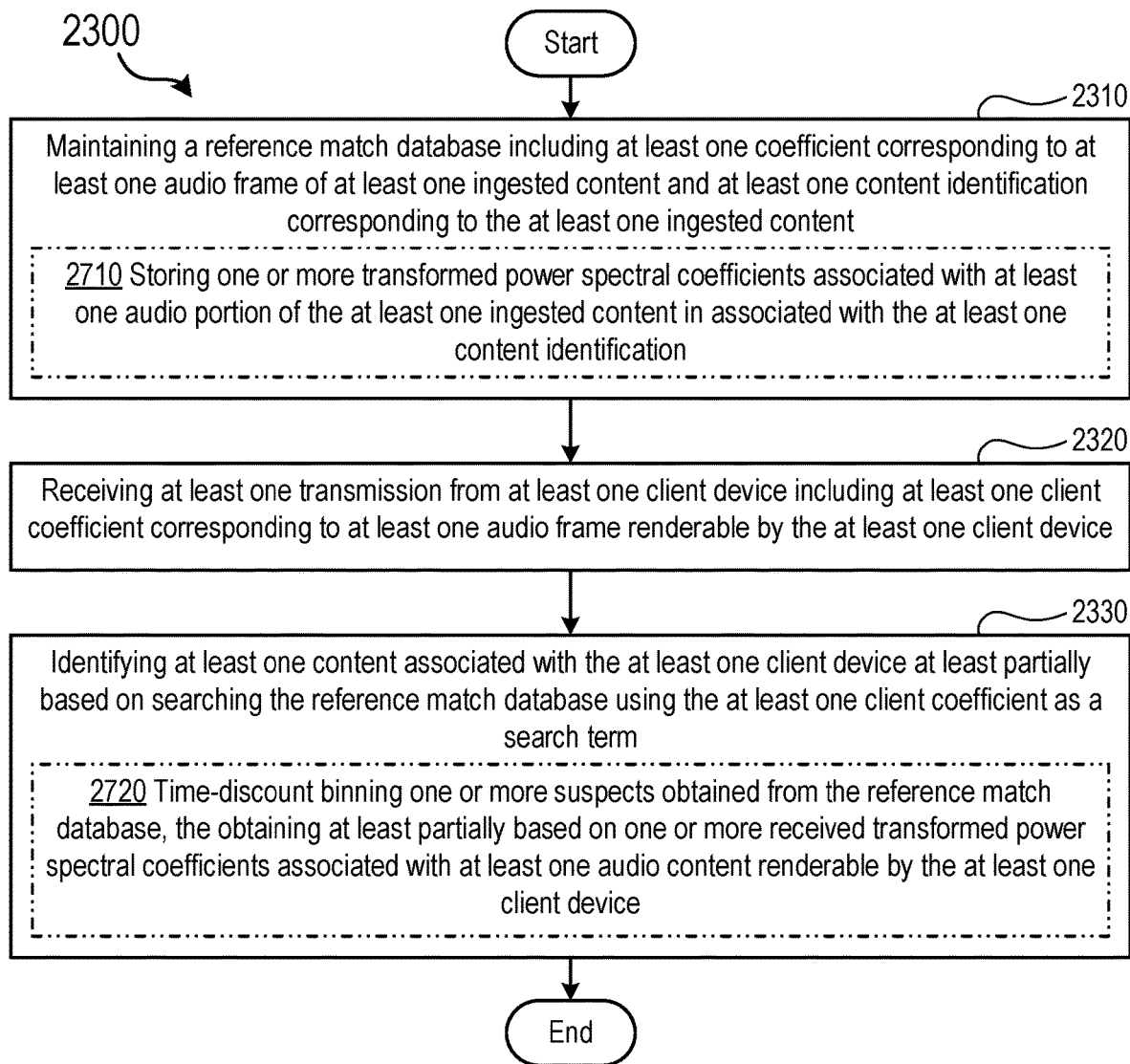

FIG. 27 illustrates an alternative embodiment of the example operational flow 2300 of FIG. 23. FIG. 26 illustrates an example embodiment where operational flow 2310 may include at least one additional operation 2710 and where operational flow 2330 may include at least one additional operation 2720.

Operation 2710 illustrates storing one or more transformed power spectral coefficients associated with at least one audio portion of the at least one ingested content in associated with the at least one content identification. For example, as shown in and/or described with respect to FIGS. 1 through 22, the media ingest operation's audio coefficients begin as frames of ingested audio content during samples having a frame size small enough that the power spectral density corresponding to the ingested audio signal remains effectively constant throughout the sample. The frame is transformed using operations disclosed herein to data subsequently stored in the reference media database and associated with an identification of a program being ingested.

Then, operation 2720 illustrates time-discount binning one or more suspects obtained from the reference match database, the obtaining at least partially based on one or more received transformed power spectral coefficients associated with at least one audio content renderable by the at least one client device. For example, as shown in and/or described with respect to FIGS. 1 through 22, the client device sending operation's audio coefficients also begin as frames of audio content, these frames corresponding to an audio portion of a program being played back on the client device, the frames obtained during samples having a frame size small enough that the power spectral density corresponding to the audio signal of the program played back on the client device remains effectively constant throughout the sample. Matching the coefficients of the known content being ingested to coefficients of the client device playing back an unknown content will lead to identification of the content being played back by the client device.

Figure 28:
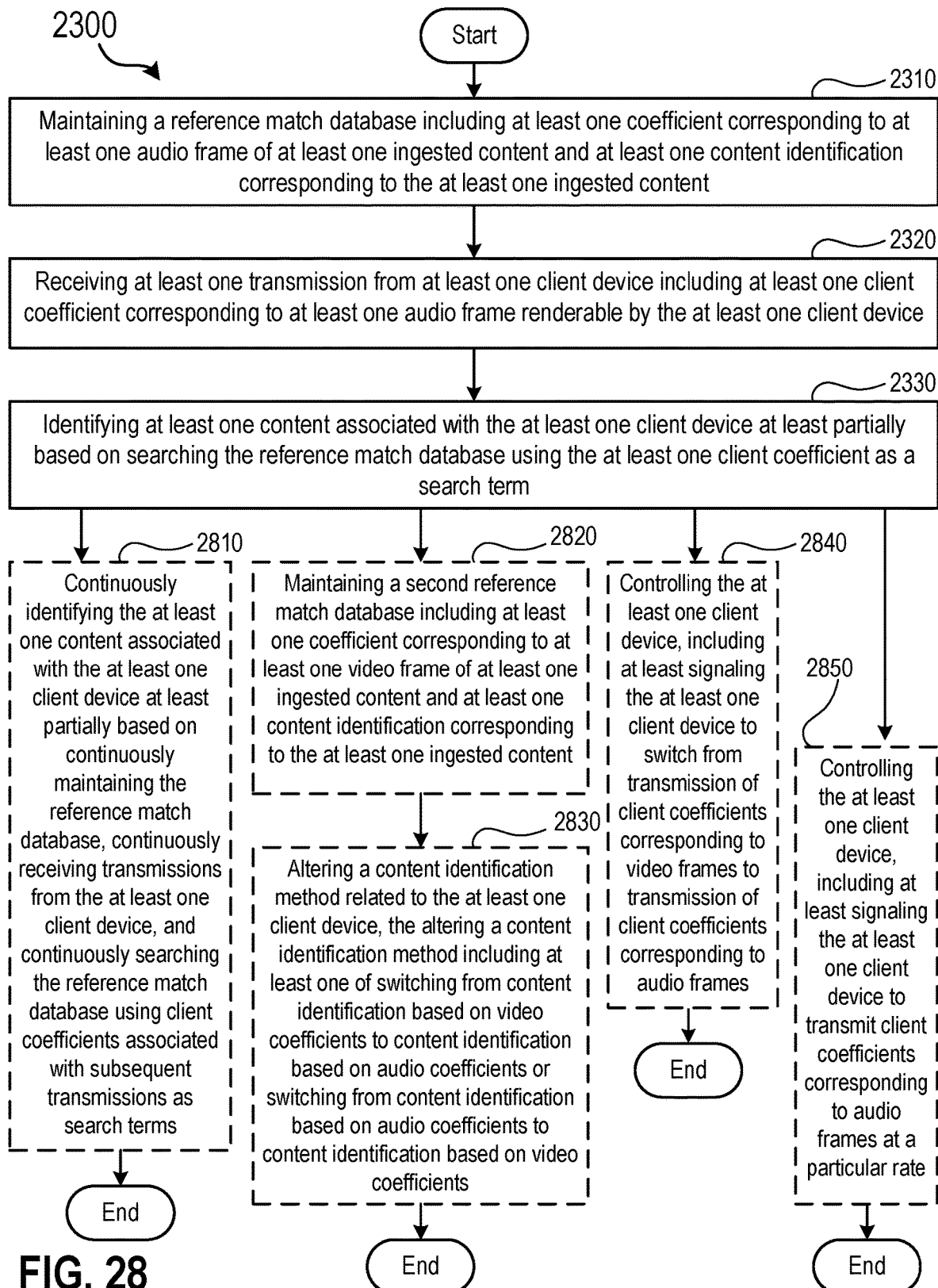

FIG. 28 illustrates alternative embodiments of the example operational flow 2300 of FIG. 23. FIG. 26 illustrates an example embodiment where operational flow 2300 may include at least one additional operation. Additional operations may include operation 2810, 2820, 2830, 2840, and/or 2850.

Operation 2810 illustrates continuously identifying the at least one content associated with the at least one client device at least partially based on continuously maintaining the reference match database, continuously receiving transmissions from the at least one client device, and continuously searching the reference match database using client coefficients associated with subsequent transmissions as search terms. For example, as shown in and/or described with respect to FIGS. 1 through 22, a received coefficient from a client device is used as a search query for the reference media database, with the result being used in a time discount binning operation. Subsequent coefficients are received from the client device and used as subsequent database searches with the results being used in the time discount binning operation. Given enough received audio coefficients from the client device, a program identification is made. Should a channel be changed on the client device, the stream of coefficients continues and a different program identification may subsequently be made. Thus, the audio matching is continuous audio matching, continuing even when a channel is changed. The operational flow then proceeds to an end operation.

Operation 2820 illustrates maintaining a second reference match database including at least one coefficient corresponding to at least one video frame of at least one ingested content and at least one content identification corresponding to the at least one ingested content. For example, as shown in and/or described with respect to FIGS. 1 through 22, in addition to producing a stream of audio coefficients for storage in the reference match database during the ingest operation, a stream of video coefficients may also be produced for storage in a reference match database corresponding to video. For optimal performance, the databases may be placed on different servers or server farms.

Then, operation 2830 illustrates altering a content identification method related to the at least one client device, the altering a content identification method including at least one of switching from content identification based on video coefficients to content identification based on audio coefficients or switching from content identification based on audio coefficients to content identification based on video coefficients. For example, as shown in and/or described with respect to FIGS. 1 through 22, the content identification operation may switch between matching using the audio coefficients and matching using the video coefficients as needed; for example, if an interruption in one of the audio or video occurs, the matching may switch to the other method. The operational flow then proceeds to an end operation.

Operation 2840 illustrates controlling the at least one client device, including at least signaling the at least one client device to switch from transmission of client coefficients corresponding to video frames to transmission of client coefficients corresponding to audio frames. For example, as shown in and/or described with respect to FIGS.

1 through 22, if the content identification operation is unable to reliably choose an identification of a program based on a stream of video coefficients from the client device, the matching server system may send a command over the Internet to the client device to begin sending audio coefficients instead of or in addition to the video coefficients so that content identification may be attempted using the audio coefficients. The converse is also possible (i.e. the matching server system may instruct the client to begin sending video coefficients instead of or in addition to the audio coefficients). The operational flow then proceeds to an end operation.

Operation 2850 illustrates controlling the at least one client device, including at least signaling the at least one client device to transmit client coefficients corresponding to audio frames at a particular rate. For example, as shown in and/or described with respect to FIGS. 1 through 22, it is not necessary that the audio coefficients be sent by the client device at the same rate as the rate at which they are produced during ingest. The matching server system may instruct the client device to send coefficients less frequently once an initial identification is made. Alternatively, the matching server system may instruct the client device to send coefficients more frequently where the importance of an accurate and/or faster identification is greater. The operational flow then proceeds to an end operation.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real-time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, computers or computing means referred to in the specification may include a single processor or may employ multiple-processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language or operating systems. It is appreciated that a variety of programming languages and operating systems may be used to implement the teachings of the present invention as described herein.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TOM or IP based communication links (e.g., packet links).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TOM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

PERTINENT TECHNICAL MATERIALS

KASAL (P.), RAMACHANDRAN (R P.): The computation of line spectral frequencies using Chebyshev polynomials, IEEE Trans. on ASSP, Vol. 34, No. 6, pp. 1419-1426, 1986.

ITAKURA (F.): Line spectral representation of linear predictive coefficients of speech signals, J. Acoust. Soc. Amer., Vol. 57, Supplement No. 1,S35,1975.

BISTRITZ (Y.), PELLERM (S.): Immittance Spectral Pairs (ISP) for speech encoding, Proc. ICASSP'93, pp. 11-9 to 11-12.

Neumeier U.S. Pat. No. 8,595,781, METHODS FOR IDENTIFYING VIDEO SEGMENTS AND DISPLAYING CONTEXTUAL TARGETED CONTENT ON A CONNECTED TELEVISION Neumeier U.S. Pat. No. 8,769,584 B2, METHODS FOR DISPLAYING CONTEXTUALLY TARGETED CONTENT ON A CONNECTED TELEVISION Neumeier U.S. Pat. No. 9,055,335—SYSTEMS AND METHODS FOR ADDRESSING A MEDIA DATABASE USING DISTANCE ASSOCIATIVE HASHING Audible Magic U.S. Pat. No. 5,918,223, METHOD AND ARTICLE OF MANUFACTURE FOR CONTENT-BASED ANALYSIS, STORAGE, RETRIEVAL, AND SEGMENTATION OF AUDIO INFORMATION Civolution U.S. Pat. No. 8,959,202 B2
Shazam U.S. Pat. No. 6,990,453
Zeitera Audio Matching—Ser. No. 14/589,366 Application

What is claimed is:

1. A computer-implemented method comprising:
receiving an audio signal associated with an unknown media segment, the audio signal representing a portion of an audio channel of the unknown media segment;
generating a set of audio frames from the audio signal, each audio frame representing a portion of the audio signal;
defining a set of coefficients from the set of audio frames at least in part by applying a transform function to the set of audio frames;
generating an audio cue using the set of coefficients, the audio cue being a representation of the audio signal; and
transmitting the audio cue to a server configured to identify the unknown media segment based on a comparison of the audio cue to reference audio cues associated with known media segments, wherein identification of the unknown media segment causes a trigger to be embedded in a subsequent media segment, the trigger being configured to cause the subsequent media segment to be replaced with a different media segment.

2. The computer-implemented method of claim 1, further comprising:
modifying the set of audio frames using a triangle window function to shape each audio frame of the set of audio frames.

3. The computer-implemented method of claim 1, wherein the transform function includes a linear predictive coding.

4. The computer-implemented method of claim 1, further comprising:
applying a line spectral pair transform to the set of coefficients to generate a transformed set of coefficients, wherein the audio cue is generated using the transformed set of coefficients.

5. The computer-implemented method of claim 1, further comprising:
applying one or more normalization functions to the set of coefficients to generate a set of normalized coefficients, wherein the set of normalized coefficients are used to generate the audio cue.

6. The computer-implemented method of claim 1, further comprising:
applying one or more quantization functions to the set of coefficients to generate a set of transformed coefficients, wherein the set of transformed coefficients are used to generate the audio cue.

7. The computer-implemented method of claim 1, wherein generating the audio cue includes:
generating a hash of the set of coefficients using hashing function; and
appending a wall-time to the hash to generate the audio cue.

8. A computing device comprising:
one or more processors; and
a non-transitory machine-readable storage medium containing instructions which when executed by the one or more processors, cause the one or more processors to perform operations including:
receiving an audio signal associated with an unknown media segment, the audio signal representing a portion of an audio channel of the unknown media segment;
generating a set of audio frames from the audio signal, each audio frame representing a portion of the audio signal;
defining a set of coefficients from the set of audio frames at least in part by applying a transform function to the set of audio frames;
generating an audio cue using the set of coefficients, the audio cue being a representation of the audio signal; and
transmitting the audio cue to a server configured to identify the unknown media segment based on a comparison of the audio cue to reference audio cues associated with known media segments, wherein identification of the unknown media segment causes a trigger to be embedded in a subsequent media segment, the trigger being configured to cause the subsequent media segment to be replaced with a different media segment.

9. The computing device of claim 8, wherein the operations further include:
modifying the set of audio frames using a triangle window function to shape each audio frame of the set of audio frames.

10. The computing device of claim 8, wherein the transform function includes a linear predictive coding.

11. The computing device of claim 8, wherein the operations further include:
executing a line spectral pair transform on the set of coefficients to generate a transformed set of coefficients, wherein the audio cue is generated using the transformed set of coefficients.

12. The computing device of claim 8, wherein the operations further include:
applying one or more normalization functions to the set of coefficients to generate a set of normalized coefficients, wherein the set of normalized coefficients are used to generate the audio cue.

13. The computing device of claim 8, wherein the operations further include:
applying one or more quantization functions to the set of coefficients to generate a set of transformed coefficients, wherein the set of transformed coefficients are used to generate the audio cue.

14. The computing device of claim 8, wherein generating the audio cue includes:
generating a hash of the set of coefficients using hashing function; and
appending a wall-time to the hash to generate the audio cue.

15. A non-transitory machine-readable storage medium containing instructions which when executed by one or more processors, cause the one or more processors to perform operations including:
receiving an audio signal associated with an unknown media segment, the audio signal representing a portion of an audio channel of the unknown media segment;
generating a set of audio frames from the audio signal, each audio frame representing a portion of the audio signal;
defining a set of coefficients from the set of audio frames at least in part by applying a transform function to the set of audio frames;

generating an audio cue using the set of coefficients, the audio cue being a representation of the audio signal; and transmitting the audio cue to a server configured to identify the unknown media segment based on a comparison of the audio cue to reference audio cues associated with known media segments, wherein identification of the unknown media segment causes a trigger to be embedded in a subsequent media segment, the trigger being configured to cause the subsequent media segment to be replaced with a different media segment.

16. The non-transitory machine-readable storage medium of claim 15, wherein the operations further include:

modifying the set of audio frames using a triangle window function to shape each audio frame of the set of audio frames.

17. The non-transitory machine-readable storage medium of claim 15, wherein the transform function includes a linear predictive coding.

18. The non-transitory machine-readable storage medium of claim 15, wherein the operations further include:

applying a line spectral pair transform to the set of coefficients to generate a transformed set of coefficients, wherein the audio cue is generated using the transformed set of coefficients.

19. The non-transitory machine-readable storage medium of claim 15, wherein the operations further include:

applying one or more normalization functions to the set of coefficients to generate a set of normalized coefficients, wherein the set of normalized coefficients are used to generate the audio cue.

20. The non-transitory machine-readable storage medium of claim 15, wherein generating the audio cue includes:

generating a hash of the set of coefficients using hashing function; and appending a wall-time to the hash to generate the audio cue.

* * * * *